United States Patent
Hayashi

(10) Patent No.: US 7,272,239 B2
(45) Date of Patent: Sep. 18, 2007

(54) INFORMATION PROCESSING METHOD AND APPARATUS, AND COMPUTER PROGRAM AND COMPUTER -READABLE STORAGE MEDIUM

(75) Inventor: Junichi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 820 days.

(21) Appl. No.: 10/419,815

(22) Filed: Apr. 22, 2003

(65) Prior Publication Data

US 2003/0202680 A1 Oct. 30, 2003

(30) Foreign Application Priority Data

Apr. 24, 2002 (JP) ............................. 2002-122600
Feb. 28, 2003 (JP) ............................. 2003-053894

(51) Int. Cl.
*G06K 9/00* (2006.01)

(52) U.S. Cl. .................................... 382/100

(58) Field of Classification Search ............... 382/100, 382/284
See application file for complete search history.

(56) References Cited

U.S. PATENT DOCUMENTS

| 6,005,936 A | 12/1999 | Shimizu et al. |
| 6,044,182 A * | 3/2000 | Daly et al. .................. 382/284 |
| 6,438,251 B1 * | 8/2002 | Yamaguchi .................. 382/100 |
| 6,487,301 B1 * | 11/2002 | Zhao .......................... 382/100 |
| 6,535,616 B1 | 3/2003 | Hayashi et al. |
| 6,807,285 B1 * | 10/2004 | Iwamura ...................... 382/100 |
| 2001/0055390 A1 | 12/2001 | Hayashi et al. |
| 2002/0172398 A1 | 11/2002 | Hayashi |
| 2002/0199106 A1 | 12/2002 | Hayashi |
| 2003/0059086 A1 | 3/2003 | Hayashi |

FOREIGN PATENT DOCUMENTS

JP           10-164549           6/1998

* cited by examiner

*Primary Examiner*—Vikkram Bali
(74) *Attorney, Agent, or Firm*—Fitzpatrick, Cella, Harper & Scinto

(57) ABSTRACT

This invention has as its object to provide a technique that can verify whether or not document data has been tampered with, by embedding identification information in document data in the background of the document data. To this end, this invention provides an information processing method for embedding additional information in document data, comprising a step of inputting document data, an extraction step of extracting identification information from the input document data as additional information, a step of inputting a predetermined image, an embedding step of embedding the additional information extracted in the extraction step in the input image, and a composition step of compositing the embedded image as a background image of the document data.

7 Claims, 23 Drawing Sheets

FIG. 8
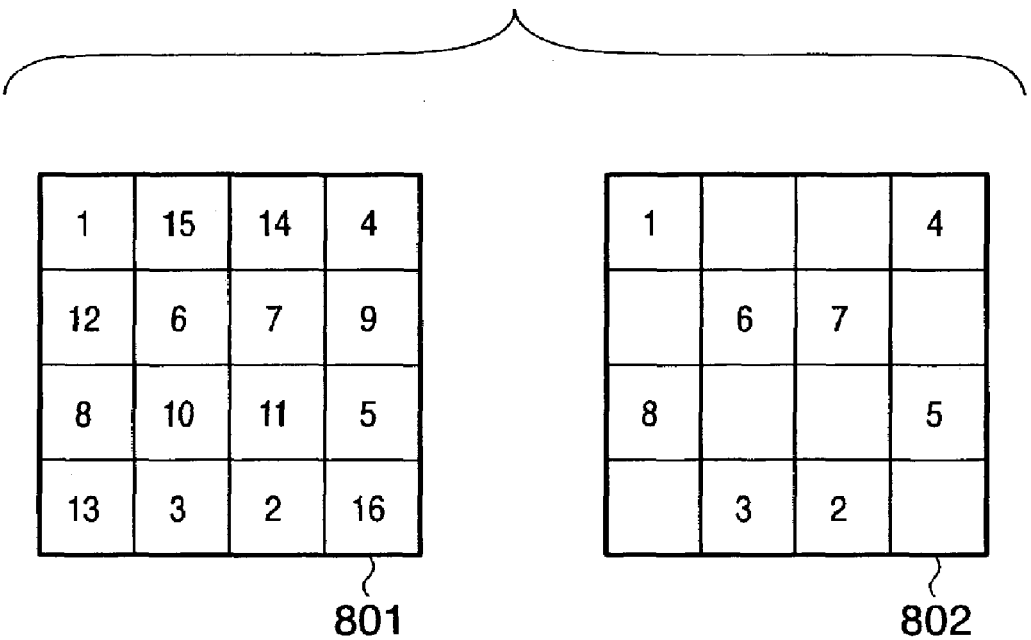
801
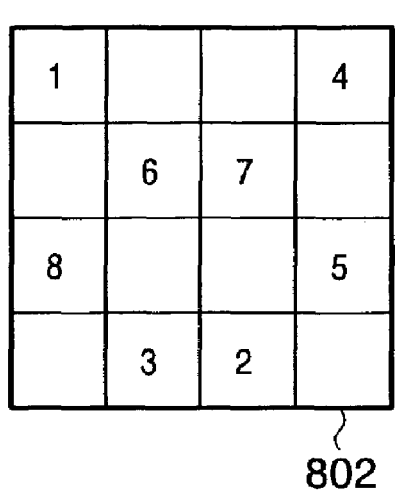
802
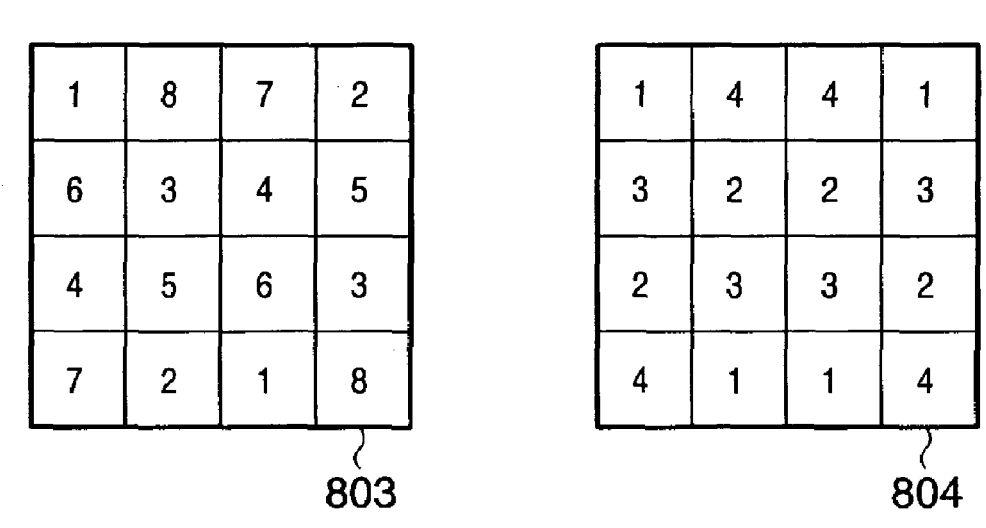
803
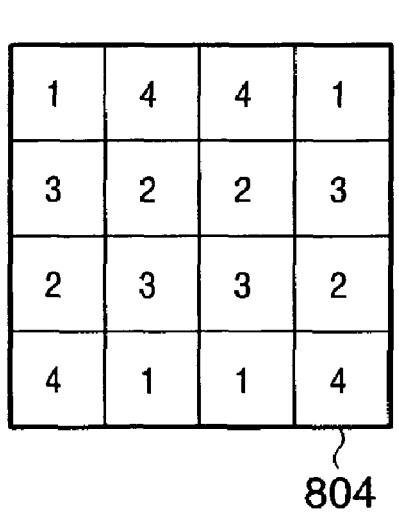
804

FIG. 9

| 0.7 | 0.7 | −0.6 | −0.6 |
|---|---|---|---|
| −0.7 | −0.7 | 0.6 | 0.6 |
| 0.9 | −0.9 | −0.8 | −0.8 |
| 0.9 | −0.9 | 0.8 | 0.8 |

$$\begin{pmatrix} I'_{00} & I'_{01} & I'_{02} & I'_{03} \\ I'_{10} & I'_{11} & I'_{12} & I'_{13} \\ I'_{20} & I'_{21} & I'_{22} & I'_{23} \\ I'_{30} & I'_{31} & I'_{32} & I'_{33} \end{pmatrix}_{1001} = \begin{pmatrix} I_{00} & I_{01} & I_{02} & I_{03} \\ I_{10} & I_{11} & I_{12} & I_{13} \\ I_{20} & I_{21} & I_{22} & I_{23} \\ I_{30} & I_{31} & I_{32} & I_{33} \end{pmatrix}_{1002} + a * \begin{pmatrix} W_{00} & W_{01} & W_{02} & W_{03} \\ W_{10} & W_{11} & W_{12} & W_{13} \\ W_{20} & W_{21} & W_{22} & W_{23} \\ W_{30} & W_{31} & W_{32} & W_{33} \end{pmatrix}_{1003}$$

FIG. 22
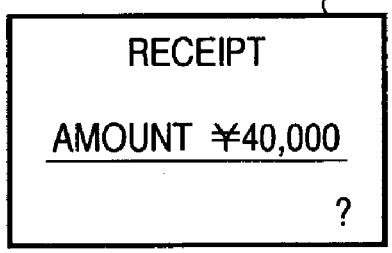
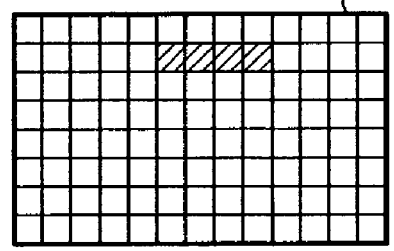
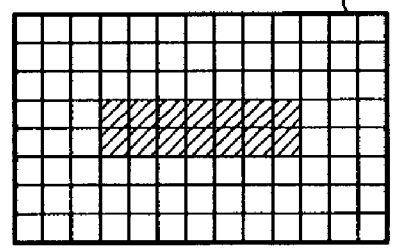
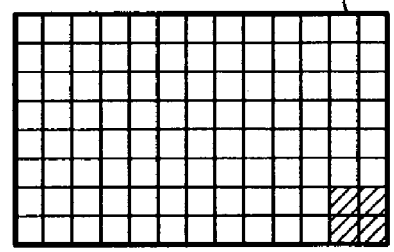

INFORMATION PROCESSING METHOD AND APPARATUS, AND COMPUTER PROGRAM AND COMPUTER-READABLE STORAGE MEDIUM

FIELD OF THE INVENTION

The present invention relates to a method and apparatus for verifying whether or not document data has been tampered with, and a computer program and computer-readable storage medium.

BACKGROUND OF THE INVENTION

In recent years, as computers and networks have advanced and prevailed rapidly, many kinds of information such as text data, image data, audio data, and the like have been digitized. Upon digitizing such information, various documents that conventionally used paper and the like are handled as digital data. However, digital data can be readily tampered with, and tampering prevention of digital data has become major concerns. For this reason, a security technique for tampering prevention has increasingly gained its importance. Hence, a method and system for detecting whether or not digital data has been tampered with or forged have been proposed.

For example, a system that exploits a digital signature is well known as a system for detecting any tampering and forgery.

Upon using a digital signature, a sender sends signature data corresponding to data together with the data, and a receiver checks the authenticity of the data by verifying the signature data. The authenticity of data is checked as follows using a Hash function and public key cryptography upon generating digital signature data.

Let Ks be a secret key, and Kp be a public key. Then, a sender makes an arithmetic operation for calculating output h with a given length (e.g., 128 bits) by compressing plaintext data M by a Hash function. The sender then makes an arithmetic operation for generating digital signature data s by converting h using secret key Ks, i.e., D(Ks, h)=s. After that, the sender sends digital signature data s and plaintext data M.

On the other hand, a receiver makes an arithmetic operation for converting received digital signature data s using public key Kp, i.e., E(Kp, s)=E(Kp, D(Ks, h"))=h", and an arithmetic operation for calculating h' by compressing received plaintext data M' by the same Hash function as the sender. If h' and h" match, the receiver determines that received data M' is authentic.

If plaintext data M has been tampered with between the sender and receiver, E(Kp, s)=E(Kp, D(Ks, h"))=hh" does not match h' obtained by compressing received plaintext data M' using the same Hash function as the sender, thus detecting tampering.

If digital signature data s is tampered with in correspondence with tampering of plaintext data M, tampering can no longer be detected. However, in this case, plaintext data M must be calculated from h, and it is impossible to make such calculation due to unidirectionality of the Hash function. As described above, data can be correctly authenticated by the digital signature using public key cryptography and Hash function.

The Hash function will be explained below. The Hash function is used to generate a digital signature and the like at high speed. The Hash function has a function of processing plaintext data M with an arbitrary length to generate output h with a given length. Note that output h is called a Hash value (or message digest, digital fingerprint) of plaintext data M. The Hash function is required to have unidirectionality and collision resistance. The unidirectionality means that if h is given, it is computationally infeasible to calculate plaintext data M that satisfies h=H(M). The collision resistance means that if plaintext data M is given, it is computationally infeasible to calculate plaintext data M' (M≠M') that satisfies H(M)=H(M'), and it is computationally infeasible to calculate plaintext data M and M' that satisfy H(M)=H(M') and M≠M'.

As the Hash function, MD-2, MD-4, MD-5, SHA-1, RIPEMD-128, RIPEMD-160, and the like are known, and these algorithms are open to the public.

Public key cryptography will be explained below. In public key cryptography, encrypt and decrypt keys are different, the encrypt key is open to the public, and the decrypt key is held in secrecy. As features of public key cryptography, (a) since the encrypt and decrypt keys are different and the encrypt key can be open to the public, the encrypt key need not be delivered in secrecy, and key delivery is easy;

(b) since the encrypt key of each user is open to the public, the user need only store his or her decrypt key in secrecy; and (c) an authentication function used by the receiver to authenticate if the sender of a message is a disguised person and that message is not tampered with can be implemented.

For example, if encryption of plaintext data M using public encrypt key Kp is given by E(Kp, M) and decryption using secret decrypt key Ks is given by D(Ks, M), the public key cryptography algorithm satisfies the following two conditions. (1) If Kp is given, it is easy to calculate E(Kp, M). If Ks is given, it is easy to calculate D(Ks, M). (2) If Ks is unknown, it is computationally infeasible to determine M even if the calculation procedures of Kp and E and C=E(Kp, M) are known.

If the following condition (3) is met in addition to the above conditions (1) and (2), a secret communication can be implemented. (3) For all plaintext data M, E(Kp, M) can be defined and D(Ks, E(Kp, M))=M. That is, since Kp is open to the public, everyone can calculate E(Kp, M), but only a person who has secret key Ks can obtain M by calculating D(Ks, E(Kp, M)).

On the other hand, if the following condition (4) is met in addition to the conditions (1) and (2), an authentication communication can be implemented. (4) For all plaintext data M, D(Ks, M) can be defined and E(Kp, D(Ks, M))=M. That is, only a person who has secret key Ks can calculate D(Ks, M), and if a third party disguises himself or herself as that person who has secret key Ks by calculating D(Ks', M) using false secret key Ks', since E(Kp, D(Ks', M))≠M, the receiver can confirm that the received information is an illicit one. Also, even when D(Ks, M) has been tampered with, since E(Kp, D(Ks, M)')≠M, the receiver can confirm that the received information is an illicit one.

As typical examples that can make the secret and authentication communications, RSA cryptography, R cryptography, W cryptography, and the like are known.

Encryption and decryption of RSA cryptography which is most prevalently used today are given by:

Encryption: encrypt key (e, n) Encrypt conversion C=Me (mod n)

Decryption: decrypt key (d, n) Decrypt conversion M=Cd (mod n)

n=p·q (where p and q are large different prime numbers)

As described above, since the RSA cryptography requires power and remainder arithmetic operations in both encryption and decryption, a huge arithmetic operation volume is required compared to common key cryptography such as DES or the like, and it is difficult to attain high-speed processing.

As described above, detection of tampering and forgery in the prior art requires a digital signature in addition to digital data. Normally, a digital signature is sent while being appended to the header of digital data. However, the appended digital signature may be easily removed by format conversion of digital data. If the digital signature is removed, digital data cannot be authenticated.

A method which can solve the above problem is disclosed in Japanese Patent Laid-Open No. 10-164549 (to be referred to as patent reference 1). In patent reference 1, a signature apparatus breaks up digital information into two fields, generates a digital signature from the segmented first field, and generates signed digital information by embedding the generated digital signature in the segmented second field as a digital watermark. On the other hand, an authentication apparatus breaks up the signed digital information into the first and second fields, generates a first digital signature from the first field, and extracts a second digital signature embedded as the digital signature from the second field. If the first and second digital signatures match, it is authenticated that the digital information is free from tampering and forgery.

As described above, in order to authenticate digital data, it is important to set authentication information such as a digital signature to be inseparable from digital information. If data to be signed is image data, the method of patent reference 1 can be applied. However, if data to be signed is a document or the like, it is difficult to apply that method.

SUMMARY OF THE INVENTION

The present invention has been made in consideration of the aforementioned problems, and has as its object to provide an information processing method and apparatus, which can verify whether or not document data such as a document or the like has been tampered with, and a computer program and computer-readable storage medium.

In order to solve the aforementioned object, for example, an information processing method of the present invention comprises the following arrangement.

That is, an information processing method for embedding additional information in document data, comprises:

a step of inputting document data;

an extraction step of extracting identification information from the input document data as additional information;

a step of inputting a predetermined image;

an embedding step of embedding the additional information extracted in the extraction step in the input image; and a composition step of compositing the embedded image as a background image of the document data.

Another invention comprises the following arrangement.

That is, an information processing method for verifying whether or not document data is tampered with, comprises:

an input step of inputting document data;

an identification information extraction step of recognizing identification information in the input document data;

an additional information extraction step of extracting additional information appended to a background of the document data; and a comparison step of comparing the identification information extracted in the identification information extraction step, and the additional information extracted in the additional information extraction step.

Still another invention comprises the following arrangement.

That is, an information processing method for embedding additional information in document data, comprises:

a step of inputting document data;

a step of inputting a predetermined image;

a feature region extraction step of extracting feature regions from the document data;

an embedding step of embedding additional information in the image data at different strengths corresponding to the feature regions; and a composition step of compositing the embedded image as a background image of the document data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 shows an example of basic matrices in the first embodiment;

FIG. 9 shows an example of a digital watermark in the first embodiment;

FIG. 10 shows an example of a digital watermark embedding arithmetic operation in the first embodiment;

FIG. 14 shows an example of extraction patterns in the first embodiment;

FIG. 22 is a view for explaining feature information in the third embodiment.

DETAILED DESCRIPTION OF THE PREFERRED EMBODIMENTS

Preferred embodiments of the present invention will be described in detail hereinafter with reference to the accompanying drawings.

Figure 3:
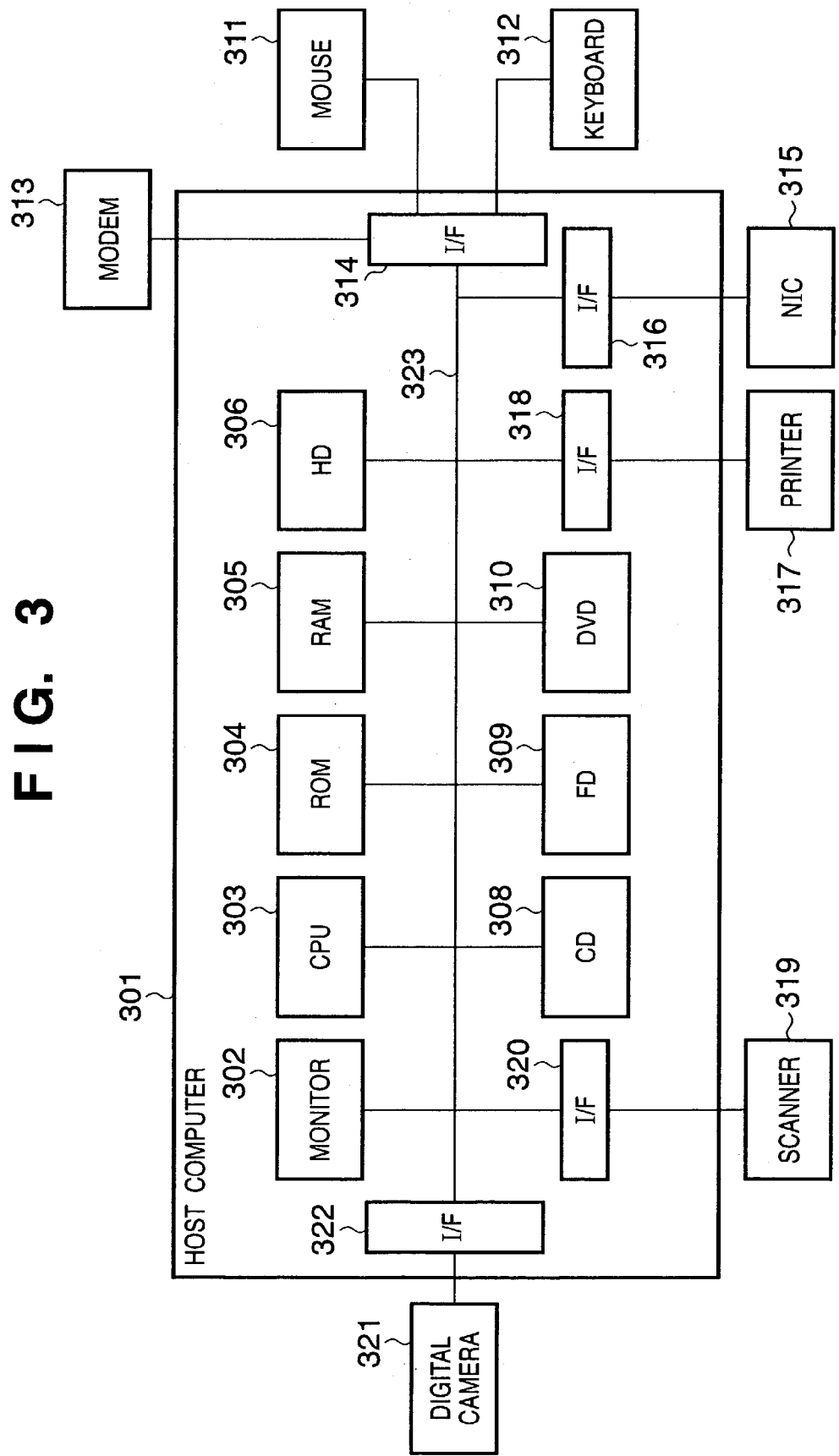
FIG. 3 is a block diagram showing the arrangement of an information processing apparatus which can be applied to the first embodiment.

FIG. 3 shows the overall arrangement of an image processing apparatus which is applied to this embodiment. Referring to FIG. 3, a host computer 301 is, e.g., a generally prevalent personal computer, which can receive an image scanned by a scanner 319, and can edit and save that image. Likewise, the host computer 301 can receive an image sensed using a digital camera 321, and can edit and save that image. Furthermore, the image obtained by the host computer 301 can be printed by a printer 317. Various user's manual instructions are issued based on inputs from a mouse 311 and keyboard 312. Moreover, the host computer 301 can exchange various data with another computer using a modem 313 and NIC (Network Interface Card) 315.

In the host computer 301, respective blocks to be described later are connected via a bus 323 to be able to exchange various data with each other.

Referring to FIG. 3, reference numeral 302 denotes a monitor which can display various kinds of information from the host computer.

Reference numeral 303 denotes a CPU, which controls the operations of internal blocks, or can execute an internally stored program. Reference numeral 304 denotes a ROM, which stores a BIOS and a boot program. Reference numeral 305 denotes a RAM which temporarily stores a program and image data to be processed so as to execute processes by the CPU 303. An OS and programs required to implement various processes described in the embodiment are loaded onto the RAM 305.

Reference numeral 306 denotes a hard disk (HD) which stores the OS and programs to be transferred to the RAM or the like, and is used to store and read out image data during the operation of the apparatus. Reference numeral 308 denotes a CD drive which can read out or write data from or in a CD (CD-R) as one of external storage media. Reference numeral 309 denotes an FD drive which can read out or write data from or in an FD as in the CD drive 308. Reference numeral 310 denotes a DVD drive 810 which can read out or write data from or in a DVD as in the CD drive 308. If the CD, FD, DVD, or the like stores an image edit program, such program is installed on the HD 306 and is transferred to the RAM 305 as needed.

Reference numeral 314 denotes an interface (I/F), which is used to accept input instructions from the pointing device (mouse (R) or the like) 311 and keyboard 312, and to exchange data with another computer via the modem 313. For this purpose, the I/F 314 is connected to these devices.

Reference numeral 316 denotes an interface (I/F) which is used to exchange various data stored in the HD 306, CD 308, FD 309, DVD 310, and the like with another computer via the NIC 315. For this purpose, the I/F 316 is connected to these devices.

Reference numeral 318 denotes a printer interface (I/F) which is used to output image data and text data stored in the HD 306, CD 308, FD 309, DVD 310, and the like onto media such as paper sheets via the printer 317. For this purpose, the I/F 318 is connected to these devices.

Reference numeral 320 denotes an interface (I/F) which is used to accept image data input from the scanner 319, and to store the image data in the HD 306 and RAM 305. For this purpose, the I/F 320 is connected to these devices.

Reference numeral 322 denotes an interface (I/F) used to accept image data sensed using the digital camera 321, and to store the image data in the HD 306 and RAM 305. For this purpose, the I/F 322 is connected to these devices.

[Signature Processor]

A signature processor (function) which is applied to this embodiment will be explained below using FIG. 1. In the following description, assume that the power supply of the host computer 301 has been turned on, the OS has been loaded onto the RAM 305, and applications required to implement processes to be described in this embodiment have been loaded onto the RAM 305. Hence, respective processors are implemented by the corresponding programs and CPU 303 which executes them, and peripheral hardware in some cases.

Figure 1:
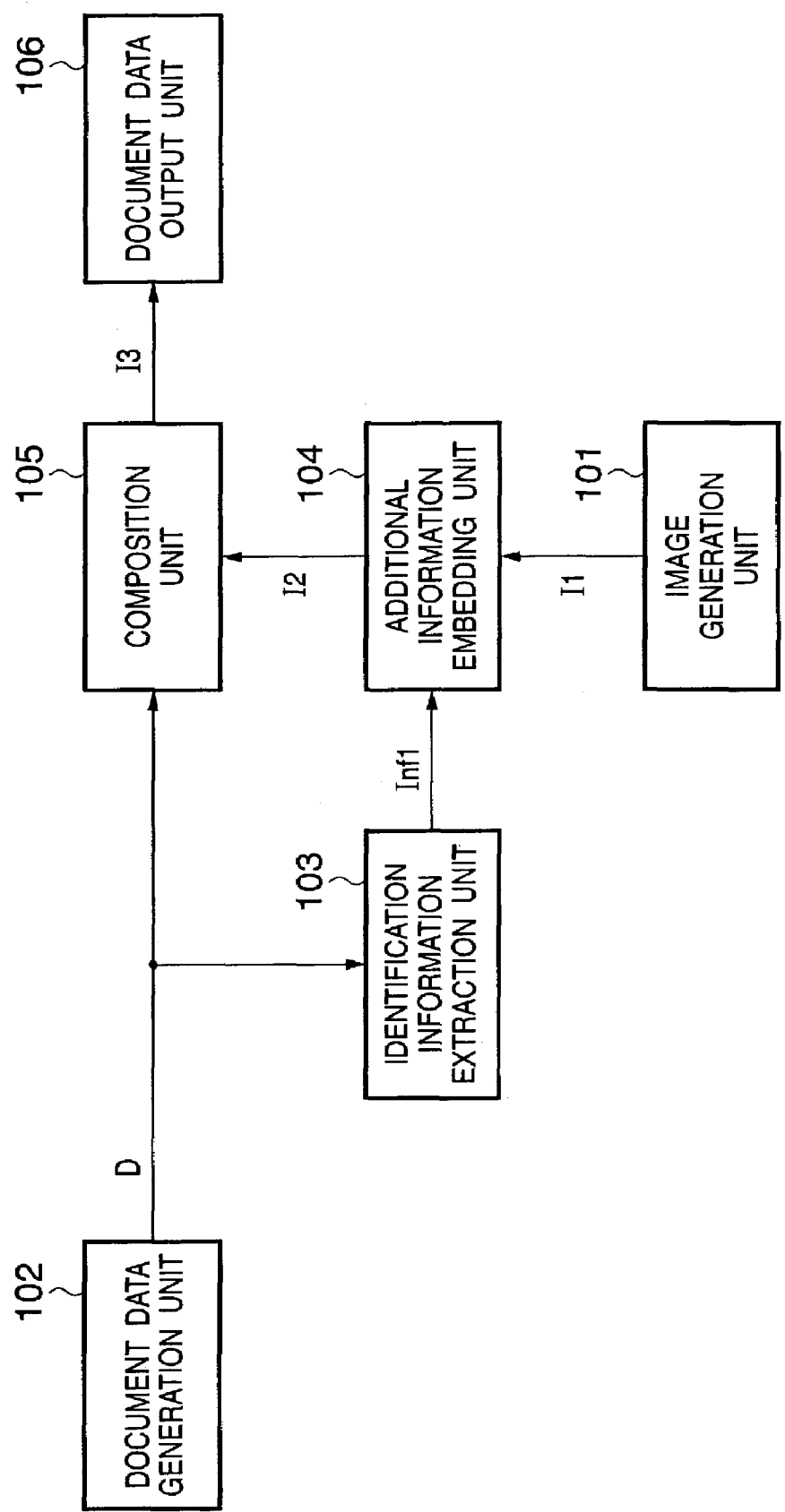
FIG. 1 is a block diagram showing the arrangement of a signature processor in the first embodiment of the present invention.

As shown in FIG. 1, the signature processor in this embodiment comprises an image generation unit 101, document data generation unit 102, identification extraction unit 103, additional information embedding unit 104, composition unit 105, and document data output unit 106.

Note that the signature process to be described below may be implemented by software processes. In such case, the aforementioned units should be considered as conceptual functions required for the process.

The function of the image generation unit 101 will be described first. The image generation unit 101 generates image data I1 to be set as the background of document data to be described later. Generated image data I1 is input to the additional information embedding unit 104.

In the following description, image data I1 expresses a multi-valued monochrome image for the sake of simplicity. However, the present invention is not limited to such specific case, and arbitrary images such as a full-color image and the like can be applied.

In order to generate image data I1, the image generation unit 101 can use various means. For example, the generation unit 101 can read out image data pre-stored in the ROM 304, RAM 305, HD 306, CD 308, FD 309, DVD 310, and the like in FIG. 3, can use image data received via a network using the NIC 315 and the like, or can use digital data obtained by digitizing a document printed on a paper sheet using the scanner 319, digital camera 321, or the like. Hence, the input source is not particularly limited. Image data I1 generated by the image generation unit 101 is temporarily held by the RAM 305.

The function of the document data generation unit 102 will be explained below. The document data generation unit 102 generates document data D to be signed by the signature processor of this embodiment. Generated document data D is input to the identification information extraction unit 103.

In the following description, document data D expresses a binary image of a document (black text on a white background) for the sake of simplicity. However, the present invention is not limited to such specific case, and a multi-valued image and full-color image can be used. When non-image data such as PDF data or the like is generated as document data D, it can be converted into image data before processes.

As means for generating document data in the document data generation unit 102, the same means as those for the image generation unit 101 mentioned above can be applied. When text data (described using ASCII codes or the like) or application-dependent data (PDF data or the like) is input as document data, a rasterize process can be executed to convert such data into image data.

Document data D generated by the document data generation unit 102 is temporarily held by the RAM 305.

The function of the identification information extraction unit 103 will be described below. The identification information extraction unit 103 reads out document data D which is output from the document data generation unit 102 to the RAM 305, extracts predetermined identification information Inf1 from document data D, and outputs extracted identification information Inf1.

An identification information extraction process implemented by the identification information extraction unit 103 will be explained in detail using FIG. 20.

Figure 20:
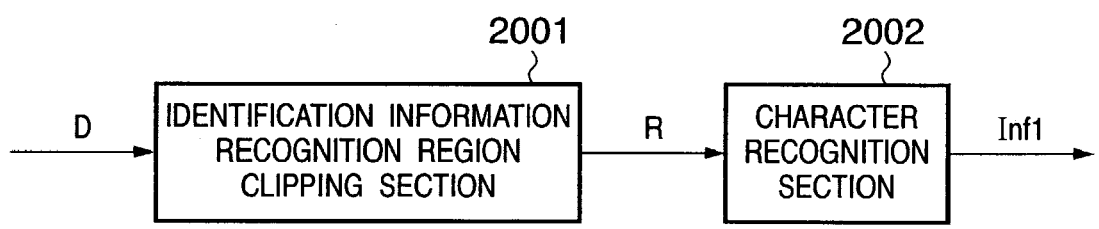
FIG. 20 is a block diagram showing the arrangement of an identification information extraction unit in the first embodiment.

As shown in FIG. 20, the identification information extraction unit 103 of this embodiment comprises an identification information region extraction section 2001 and character recognition section 2002.

The function of the identification information region clipping section 2001 will be described below. The identification information region extraction section 2001 receives document data D (data that contains character images), clips a region which is to undergo the subsequent character recognition process from document data D, and outputs clipped region data R.

The function of the character recognition section 2002 will be described below. The character recognition section 2002 receives the region data R clipped by the identification information region extraction section 2001, executes a character recognition process for that region data R, and outputs a result Inf1 of the character recognition process.

The aforementioned process of the identification information extraction unit 103 is that executed when there is one region which is to undergo character recognition. If there are a plurality of regions which are to undergo character recognition, character recognition is made a plurality of number of times. Furthermore, if different types of characters are to be recognized, an optimal character recognition method is selected to extract identification information. Information extracted by the aforementioned process is output as identification information Inf1. Output identification information Inf1 is temporarily held by the RAM 305.

Note that the process executed by the identification information extraction unit 103 in this embodiment is not limited to the aforementioned identification information extraction process, and various other processes may be used.

For example, as a method of making the user interactively select identification information, document data D is displayed on the monitor 302 or the like, the user designates desired information in document data D using the mouse 311 or keyboard 312, and information at the designated position is extracted, thus extracting identification information Inf1.

On the other hand, if document data D is a receipt, contract document, or the like, its format is determined in advance, and the positions of data to be signed such as an amount, contractant, and the like are often specified in advance. In such case, information of the position of each data to be signed, which is specified in advance, may be used as region data R.

Since the aforementioned region data R is required upon verifying a signature later, it must be common to that used in a verification process to be described later. Hence, the signature processor and a verification processor may share that data in advance or the signature processor may send that data to the verification processor via a network. If document data D has a predetermined format, information which represents this format may be sent. Furthermore, information which represents the format may be visibly or invisibly appended to document data D.

Extracted identification information Inf1 may be encrypted not to be readily misused. And/or identification information Inf1 may undergo error correction encoding so as to correctly extract identification information Inf1, even when an ill-disposed person has changed the contents of image data I2 in which identification information Inf1 is embedded as a digital watermark to be described later (to be referred to as attack hereinafter) so that information Inf1 can no longer be extracted from image data I2. Identification information Inf1 output in this way is temporarily held by the RAM 305.

The function of the additional information embedding unit 104 will be explained below. Image data I1 generated by the image generation unit 101, and identification information Inf1 extracted by the identification information extraction unit 103 are temporarily stored in the RAM 305. The additional information embedding unit 104 receives these data from the RAM 305, embeds input identification information Inf1 in image data I1 as additional information (digital watermark), and outputs embedded image data I2. Details of the digital watermark embedding method will be described later. Image data I2 embedded with additional information Inf1 is temporarily held by the RAM 305.

The function of the composition unit 105 will be explained below. The composition unit 105 receives document data D generated by the document data generation unit 102, and image data I2 embedded with additional information Inf1 by the additional information embedding unit 104 via the RAM 305, composites input document data D and image data I2, and outputs composite data I3.

Figure 4:
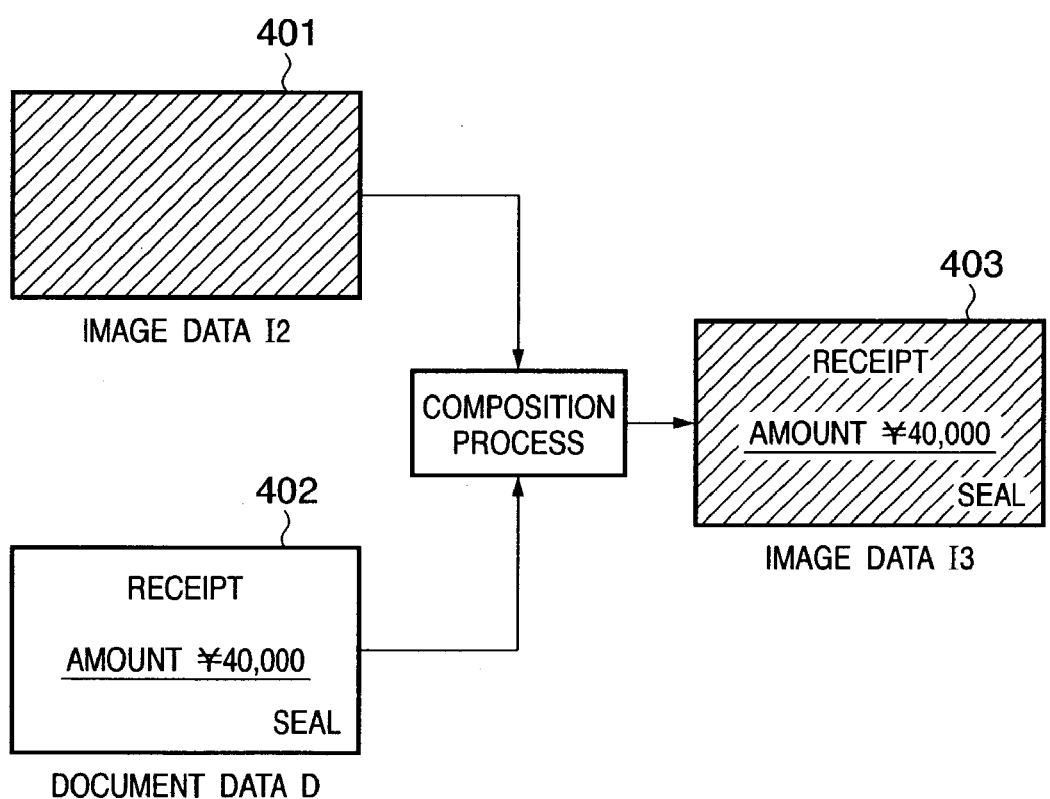
FIG. 4 is a view for explaining a composition processor in the first embodiment.

An example of the process to be implemented by the composition unit 105 will be described below using FIG. 4. Referring to FIG. 4, reference numeral 401 denotes image data I2 (data embedded with additional information) input to the composition unit 105; 402, document data D input to the composition unit 105; and 403, image data I3 obtained by compositing the image data 401 and document data 402 by the composition unit 105.

As shown in FIG. 4, image data I2 is composited to be superposed on document data D as its background. Image data I3 composited in this way is temporarily held by the RAM 305.

The function of the document output unit 106 will be described below. The document data output unit 106 receives image data I3 composited by the composition unit 105 via the RAM 305, and outputs input image data I3.

Means for outputting image data I3 can include various means. For example, image data may be recorded on the RAM 305, HD 306, CD 308 (in case of a CD-R or CD-RW), FD 309, DVD 310 (in case of a DVD-RAM, DVD-R, or the like), or the like in FIG. 3, may be sent via a network using the modem 313, NIC 315, and the like, or may be printed on a paper sheet using the printer 317 and the like.

The operation of the signature processor in this embodiment has been explained.

[Verification Processor]

A verification processor (function) which is applied to this embodiment will be described below using FIG. 2.

Figure 2:
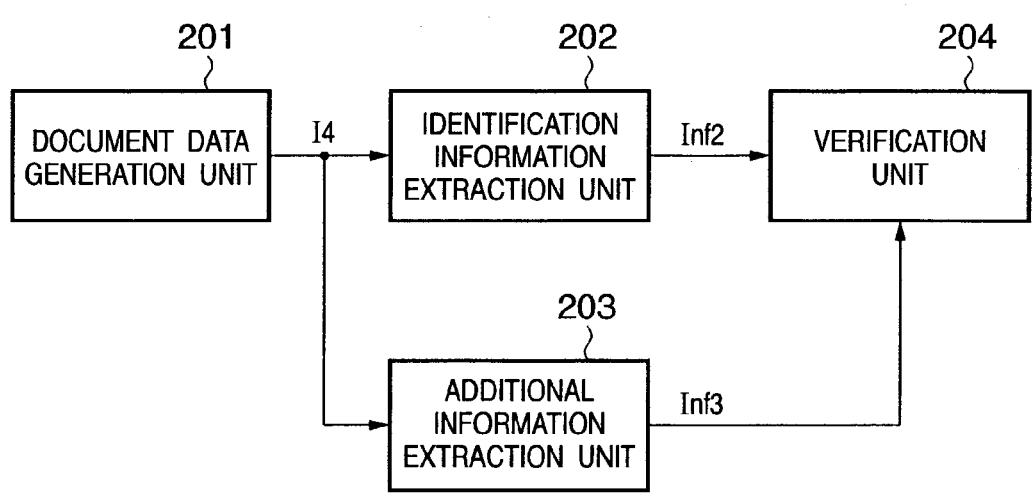
FIG. 2 is a block diagram showing the arrangement of a verification processor in the first embodiment.

As shown in FIG. 2, the verification processor of this embodiment comprises a document data generation unit 201, identification information extraction unit 202, additional information extraction unit 203, and verification unit 204.

Note that the verification process to be described below may be implemented by software processes. In such case, the aforementioned units should be considered as conceptual functions required for the process. The apparatus arrangement on the verification side will be explained using FIG. 3 for the sake of simplicity. However, the verification processor may be implemented as an independent apparatus, as a matter of course.

The function of the document data generation unit 201 will be described below. The document data generation unit 201 generates document data I4 to be verified. Generated document data I4 is supplied to the identification information extraction unit 202. Since means for generating document data I4 in the document data generation unit 201 can adopt the same means as those of the image generation unit 101 in FIG. 1, a detailed description thereof will be omitted. Note that document data I4 generated by the document data generation unit 201 is preferably document data I3 output from the document data output unit 106 in FIG. 1. Or a copy of document data I3 formed by a copying machine or the like may be input as document data I4. Also, document data which is not the one that has undergone the signature process in the signature processor of this embodiment may be input. An object of the verification processor of this embodiment is to provide a method that can identify such data. Document data I4 generated by the document data generation unit 201 is temporarily held by the RAM 305.

The function of the identification information extraction unit 202 will be explained below. Since document data I4 output from the document data generation unit 201 is held by the RAM 305, the identification information extraction unit 202 receives that data. The unit 202 extracts identification information at a predetermined position of input document data I4, and outputs extracted identification information Inf2.

Note that the predetermined position which is to undergo the identification information extraction process must be equal to the position from which the identification information has been extracted by the identification information extraction unit 103 in FIG. 1. Information associated with this position can be equally set by sharing that information by the signature processor and verification processor in advance, or sending that information from the signature processor to the verification processor via a network in advance. When document data D has a predetermined format, information which represents this format may be received from the aforementioned signature processor to determine information associated with the position. Furthermore, the information which represents the format and has been visibly or invisibly appended to document data D may be extracted to determine information associated with the position.

Note that the process to be implemented by the identification information extraction unit 202 is the same as that to be implemented by the identification information extraction unit 103 in FIG. 1, and a detailed description thereof will be omitted. Extracted identification information Inf2 is temporarily held by the RAM 305.

The function of the additional information extraction unit 203 will be described below. The additional information extraction unit 203 receives document data I4 which is output from the document data generation unit 201 to the RAM 305. The unit 203 extracts additional information Inf3 embedded as a digital watermark from input document data I4, and outputs extracted additional information Inf3. Details of the digital watermark extraction method will be explained later.

When extracted additional information Inf3 undergoes error correction encoding, an error correction decoding process is executed. On the other hand, when information Inf3 is encrypted, a decryption process is executed. Extracted additional information Inf3 is temporarily held by the RAM 305.

The function of the verification unit 204 will be described below. The verification unit 204 receives identification information Inf2 extracted by the identification information extraction unit 202, and additional information Inf3 extracted by the additional information extraction unit 203 via the RAM 305, and executes a verification process by comparing input identification information Inf2 and additional information Inf3.

In the verification process, input identification information Inf2 and additional information Inf3 are compared, and if the two pieces of information are equal to each other, it is determined that "information has not been tampered with"; otherwise, it is determined that "information has been tampered with". If it is determined that "information has been tampered with", the tampered position in identification information Inf2 can also be notified. Furthermore, the verification process result can be displayed on the monitor 302 as image data to indicate the tampered position in identification information Inf2.

Figure 5:
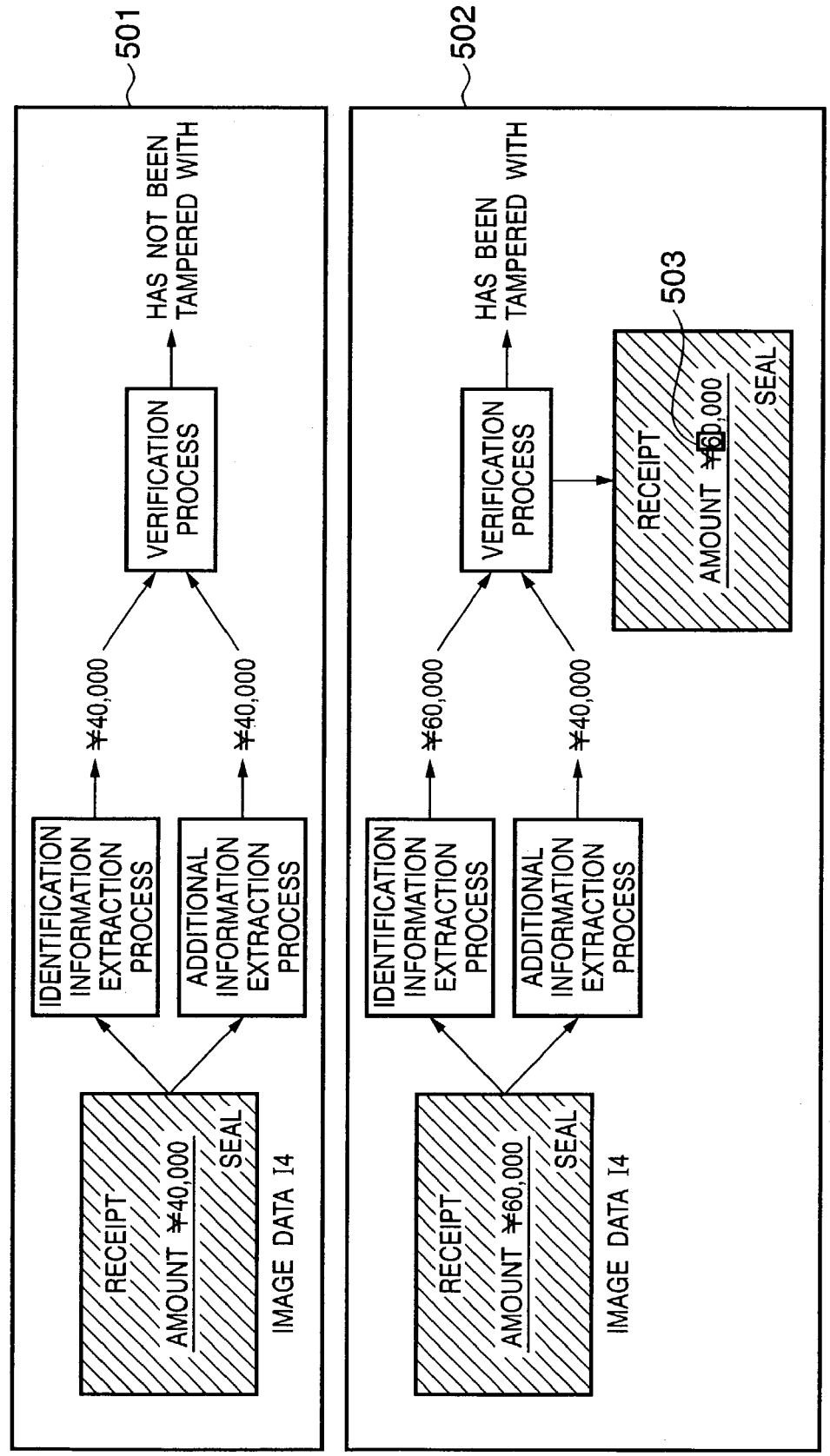
FIG. 5 is a view for explaining the verification processor in the first embodiment.

An example of the verification process to be implemented by the verification unit 204 will be explained below using FIG. 5. Referring to FIG. 5, reference numeral 501 denotes an example of the flow of the process when information has not been tampered with; and 502, an example of the flow of the process when information has been tampered with. Reference numeral 503 in the process example 502 denotes an example of image data which indicates the tampered position.

In the example 501, since identification information Inf2 "¥40,000" is equal to additional information Inf3 "¥40,000", it is determined that "information has not been tampered with". On the other hand, in the example 502, since identification information Inf2 "¥60,000" is different from additional information Inf3 "¥40,000", it is determined that "information has been tampered with". Furthermore, if it is determined that "information has been tampered with", image data in which the tampered position is bounded by a frame or is hatched to easily visibly confirm is generated, and is displayed on the monitor 302 or the like, thereby clearly indicating the tampered position 503 for the user.

The verification processor of this embodiment has been explained.

[Digital Watermark Embedding]

A digital watermark embedding processor (function) which is applied to the present invention will be described below using FIG. 6.

Digital watermarking to be described below is also called "invisible" digital watermarking, and is a technique for appending a change in level, which is as small as a person can hardly visibly perceive, to original image data I. One or combinations of such change amounts represent arbitrary additional information.

Figure 6:
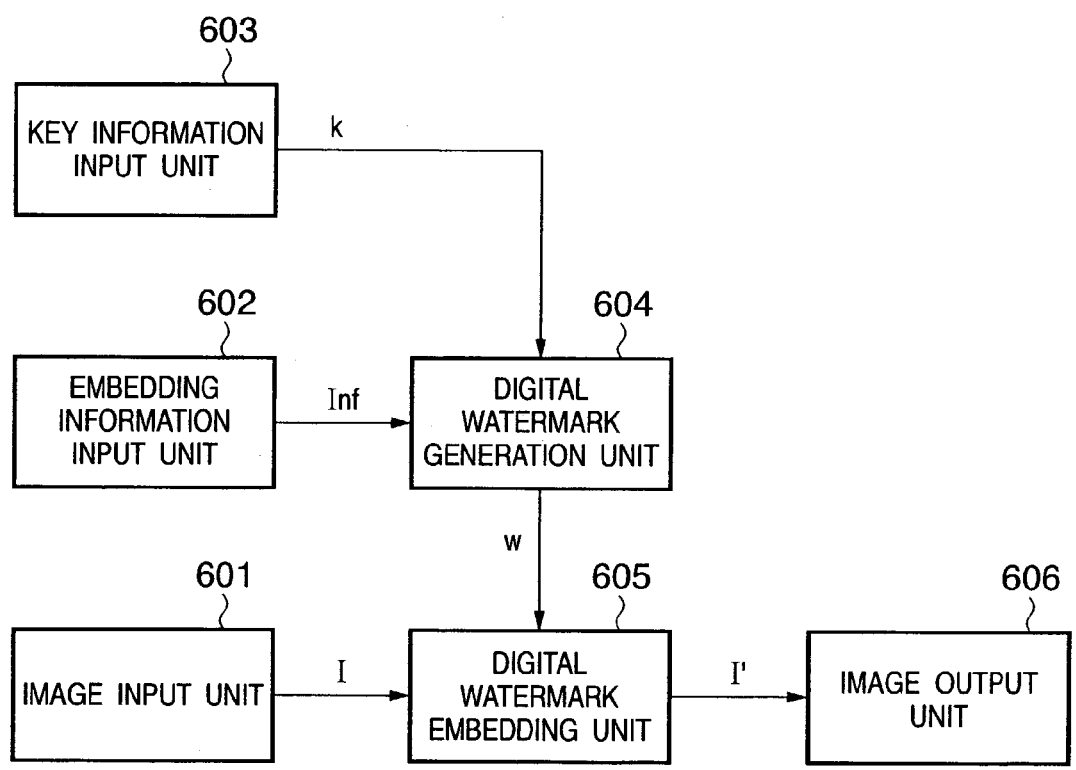
FIG. 6 is a block diagram for explaining a digital watermark embedding process in the first embodiment.

As shown in FIG. 6, the embedding processor (corresponding to the additional information embedding unit 104) in this embodiment comprises an image input unit 601, embedding information input unit 602, key information input unit 603, digital watermark generation unit 604, digital watermark embedding unit 605, and image output unit 606.

Note that the digital watermark embedding process to be described below may be implemented by a software process. In this case, the aforementioned units should be considered as conceptual functions required for the process.

The function of the image input unit 601 will be described below. The image input unit 601 receives image data I that represents an image in which watermark information is to be embedded. That image data I is output from the image input unit 601, and is input to the digital watermark embedding unit 605.

In the following description, assume that image data I represents a monochrome multi-valued image for the sake of simplicity. However, the present invention is not limited to such specific case. For example, when a digital watermark is embedded in image data such as color image data consisting of a plurality of color components, each of R, G, and B components or luminance and color difference components as the plurality of color components is handled in the same manner as a monochrome multi-valued image, and a watermark can be embedded in each component. In this case, a data size three times that of a monochrome multi-valued image can be embedded.

The function of the embedding information input unit 602 will be described below. The embedding information input unit 602 receives a binary data sequence to be embedded in image data I as a digital watermark. This binary data sequence is output from the embedding information input unit 602, and is input to the digital watermark generation unit 604.

This binary data sequence will be referred to as additional information Inf1 hereinafter. Additional information Inf is formed of a combination of bits each of which indicates either '0' or '1'.

Note that additional information Inf may be encrypted not to be readily misused. And/or additional information Inf may undergo error correction encoding so as to correctly extract additional information Inf even when an ill-disposed person has changed (to be referred to as attack hereinafter) the contents of image data I embedded with this additional information Inf as a digital watermark (to be referred to as attack hereinafter) so that additional information Inf can no longer be extracted from it.

Note that not all attacks are deliberate. For example, general image processes (irreversible compression, luminance correction, geometric transformation, filtering, and the like) may consequently remove a digital watermark, and such processes can also be considered as attacks.

Since processes such as encryption, error correction encoding, and the like are known to those who are skilled in the art, a detailed description thereof will be omitted. A case will be exemplified in detail below wherein n-bit additional information is to be embedded.

The function of the key information input unit 603 will be described below. The key information input unit 603 receives key information k required to embed and extract additional information Inf, and outputs it. Key information k output from the key information input unit 603 is input to the digital watermark generation unit 604.

Note that key information k is a real number expressed by L (positive number) bits. An example of key information k is "01010101" if it is expressed as a positive number when L=8, and is given by "85" (decimal notation) if it is expressed as a positive integer. Key information k is given as an initial value of a pseudo random number generation process executed by a pseudo random number generator 702 (to be described later). As long as the digital watermark embedding processor and a digital watermark extraction processor (to be described later) use common key information k, additional information Inf embedded as a digital watermark can be correctly extracted. In other words, only a user who possesses key information k can correctly extract additional information Inf.

The function of the digital watermark generation unit 604 will be explained below. The digital watermark generation unit 604 receives additional information Inf from the embedding information input unit 602, and key information k from the key information input unit 603, and generates and outputs digital watermark w on the basis of input additional information Inf and key information k.

Figure 7:
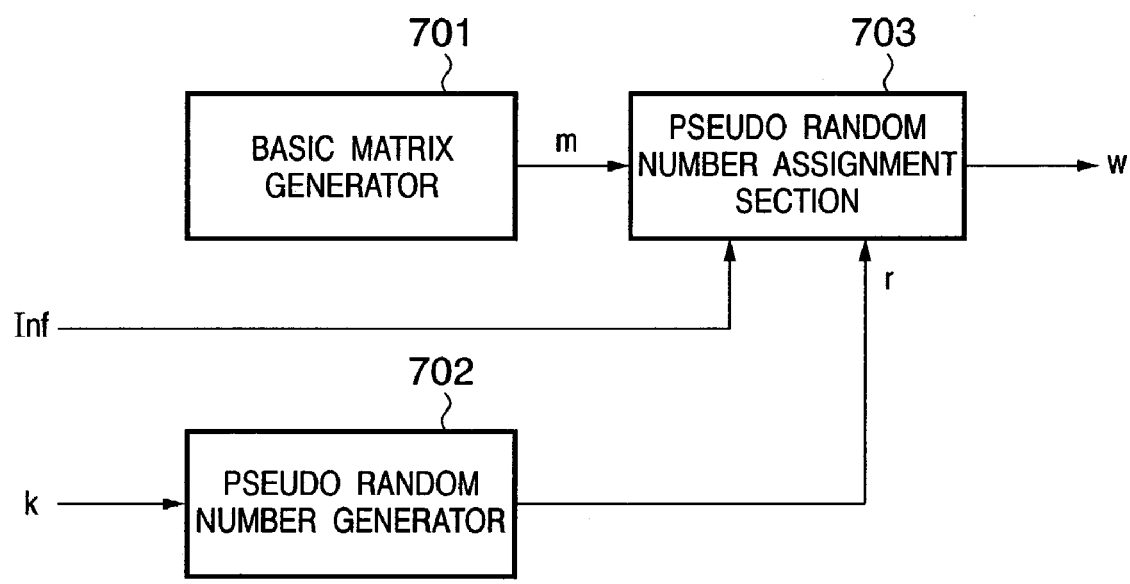
FIG. 7 is a block diagram for explaining a digital watermark generation unit in the first embodiment.

Details of the function of the digital watermark generation unit 604 will be explained below using FIG. 7. As shown in FIG. 7, the digital watermark generation unit 604 comprises a basic matrix generator 701, pseudo random number generator 702, and pseudo random number assignment section 703.

The function of the basic matrix generator 701 will be explained first. The basic matrix generator 701 generates basic matrix m. Generated basic matrix m is supplied to the pseudo random number assignment section 703. Note that basic matrix m is used to specify correspondence between the positions of bits which form additional information Inf, and the pixel positions of image data I where respective bits are to be embedded.

The basic matrix generator 701 can selectively use a plurality of basic matrices. A basic matrix to be used must be changed in correspondence with the purpose intended/ situation. In the present invention, by switching the basic matrix, an optimal digital watermark (additional information Inf) can be embedded.

FIG. 8 shows examples of basic matrices m. A matrix 801 is an example of basic matrix m used upon embedding 16-bit additional information Inf. In order to embed 16-bit additional information Inf, as indicated by the matrix 801, for example, 4×4 basic matrix m is used, and numerals ranging from 1 to 16 are assigned to respective elements in the basic matrix.

As can be seen from FIG. 8, the values of elements of basic matrix m correspond to the bit positions of additional information Inf. More specifically, the most significant bit of additional information Inf1 is embedded at a position where the value of an element in the basic matrix is "1" and, likewise, a bit next to the most significant bit of additional information Inf is embedded at a position where the value of an element in the basic matrix is "2". Then, subsequent bits are embedded in turn.

Modifications of the embedding method from the matrix 801 will be explained below.

A matrix 802 in FIG. 8 is an example of a basic matrix used upon embedding 8-bit additional information Inf. The basic matrix 802 uses only elements having values 1 to 8 of all the elements of the basic matrix 801. Additional information Inf is not embedded at positions of elements having no entries. As shown in the matrix 802, by scattering positions corresponding to respective bits of additional information Inf, a change in image (image quality deterioration) upon embedding additional information Inf can be harder to recognize than the matrix 801.

A matrix 803 in FIG. 8 is another example of basic matrix m used upon embedding 8-bit additional information Inf as in the matrix 802. The matrices 802 and 803 are basic matrices m which can embed 8-bit additional information Inf. The matrix 802 uses 50% of all pixels to embed additional information Inf, while the matrix 803 uses all pixels (100%) to embed additional information Inf. That is, the matrix 802 embeds 1 bit using one pixel in the basic matrix, while the matrix 803 embeds 1 bit using two pixels in the basic matrix. Hence, by increasing the number of times of embedding bits which represent additional information Inf, as shown in the matrix 803, a digital watermark (additional information Inf) can be extracted more reliably (higher robustness against attacks is obtained) than the matrices 801 and 802, even when an image embedded with that digital watermark has been attacked.

Note that the ratio of pixels used to embed watermark information will be referred to as a "filling ratio" hereinafter. Note that the filling ratio upon using the matrix 801 is 100%, that upon using the matrix 802 is 50%, and that upon using the matrix 803 is 100%.

A matrix 804 in FIG. 8 uses all pixels to embed additional information Inf1 as in the matrix 803. That is, the filling ratio is 100%. However, the matrix 803 can embed 8-bit additional information Inf, while the matrix 804 can embed only 4-bit additional information Inf. But the matrix 803 uses two pixels to embed 1 bit, while the matrix 804 embeds 1 bit of additional information Inf using four pixels in the basic matrix. By increasing the number of times of embedding bits that express additional information Inf, as shown in the matrix 804, a digital watermark (additional information Inf) can be extracted more reliably (higher robustness against attacks is obtained) than the matrices 801, 802, and 803, even when an image embedded with that digital watermark has been attacked. However, the information size of additional information Inf to be embedded is 4 bits, and is smaller than the matrices 801, 802, and 803, although higher robustness against attacks can be assured.

The aforementioned four examples can be tabularized as follows:

TABLE 1

| Basic matrix | Filling ratio | Number of pixels used/bit | Information size that can be embedded |
|---|---|---|---|
| 801 | 100% | 1 pixel | 16 bits |
| 802 | 50% | 1 pixel | 8 bits |
| 803 | 100% | 2 pixels | 8 bits |
| 804 | 100% | 4 pixels | 4 bits |

In this manner, by selecting the configuration of basic matrix m, the filling ratio, the number of pixels to be used to embed 1 bit, and the information size that can be embedded can be selectively set. In Table 1 above, the filling ratio is a parameter that influences the image quality of an image in which a digital watermark is embedded, and the number of pixels used to embed 1 bit is a parameter that mainly influences the robustness against attacks. Therefore, an image embedded with a digital watermark suffers larger quality deterioration with increasing filling ratio. Also, the robustness against attacks becomes higher with increasing number of pixels used to embed 1 bit.

As can be seen from the above description, the image quality of an image to be embedded with a digital watermark, robustness against attacks, and information size of additional information that can be embedded have a trade-off relationship upon implementing digital watermarking.

In this embodiment, the robustness of a digital watermark, image quality, and information size can be controlled and set by adaptively selecting a plurality of types of basic matrices m.

Basic matrix m generated as described above is output to the pseudo random number assignment section 703.

The function of the pseudo random number generator 702 will be explained below. The pseudo random number generator 702 receives key information k, and generates pseudo random number sequence r on the basis of input key information k. Generated random number sequence r is output, and is input to the pseudo random number assignment section 703. Note that pseudo random number sequence r is a real number sequence (a plurality of real numbers) according to a uniform distribution included within the range $\{-1, 1\}$. Furthermore, key information k is used as an initial value upon generating a pseudo random number sequence. That is, a first pseudo random number sequence generated using first key information is different from a second pseudo random number sequence generated using second key information. Since a method of generating pseudo random number sequence r is known to those who are skilled in the art, a detailed description thereof will be omitted. Generated pseudo random number sequence r is output to the pseudo random number sequence assignment section 703.

The function of the pseudo random number assignment section 703 will be described below. The pseudo random number assignment section 703 receives basic matrix m and pseudo random number sequence r, and assigns respective elements of pseudo random number sequence r to predetermined elements of basic matrix m. Basic matrix m to predetermined elements of which respective elements of the random number sequence are assigned will be referred to as digital watermark w hereinafter. The pseudo random number assignment section 703 outputs generated digital watermark w.

Details of the process for assigning respective elements of pseudo random number sequence r to predetermined elements of basic matrix m will be described below using examples.

A case will be exemplified wherein the basic matrix 804 shown in FIG. 8 is used. As described above, 4-bit information can be embedded using the basic matrix 804.

Initially, of respective elements in the matrix 804, those having a value "1" are scanned in the raster order to assign respective elements of random number sequence r in turn. In this case, assignment is made in accordance with additional information Inf. That is, if a bit of additional information Inf is "1", an element of pseudo random number sequence r is assigned intact; if a bit of additional information Inf1 is "0", a value obtained by multiplying an element of pseudo random number sequence r by "−1" is assigned.

Figure 9:
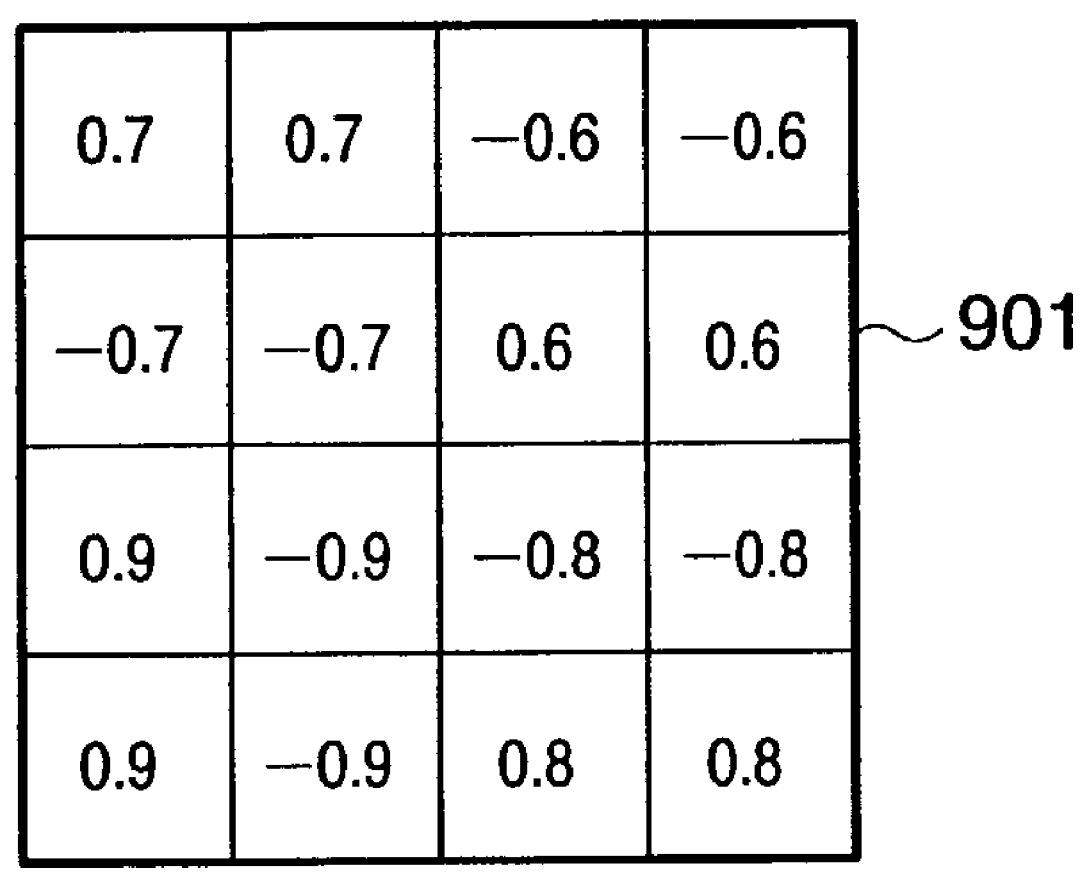

Then, the same process is repeated for elements having a value "2". The aforementioned process is repeated up to elements having a value n (the number of bits to be embedded). FIG. 9 shows an example of digital watermark w generated by the aforementioned example. A digital watermark 901 in FIG. 9 is generated when, for example, a real number sequence r=$\{0.7, -0.6, -0.9, 0.8 \ldots\}$ is used as pseudo random number sequence r, and 4-bit information "1001" is used as additional information Inf.

Details of the above process will be explained below. Note that a left-to-right scan is made in the order of the first, second, . . . rows.

The most significant bit of additional information Inf1 is "1", and the first corresponding random number is 0.7. Therefore, the first pseudo random number "0.7" is assigned to a position of "1" which is detected first upon scanning the basic matrix 804. The second pseudo random number "−0.6" is assigned to a position of "1" which is detected next. Likewise, every time "1" of the basic matrix is detected, a pseudo random number of the corresponding order is assigned.

When a bit "0" next to the most significant bit of additional information Inf1 is embedded, a value obtained by multiplying a pseudo random number by −1 is assigned. That is, pseudo random numbers {−0.7, 0.6, 0.9, −0.8 . . . }, whose sign is inverted, are assigned in turn every time "2" of the basic matrix is detected.

The same process is repeated for the third and fourth bits of additional information Inf, thereby obtaining digital watermark w, i.e., the watermark 901 shown in FIG. 9.

Digital watermark w generated in this way is output from the digital watermark generation unit 604, and is input to the digital watermark embedding unit 605.

In the above example, 4×4 basic matrices are used to embed additional information Inf1 each consisting of 16 bits, 8 bits, and 4 bits. However, the present invention is not limited to such specific example. For example, more pixels may be used to 1 bit, and a basic matrix with a larger size may be used. Such example is also included in the scope of the present invention. If a basic matrix with a larger size is used, a pseudo random number sequence uses a longer real number sequence. In practice, the aforementioned random number sequence which consists of four elements may disturb a normal function of a digital watermark extraction process (to be described later). (More specifically, although additional information Inf is embedded, correlation coefficients between integrated image c and digital watermarks w1, w2, . . . , wn may become small.) Hence, in order to embed, e.g., 64-bit additional information, a 256×256 basic matrix m can be used at a filling ratio of 50%. (In this case, 512 pixels are used to embed 1 bit.)

The function of the digital watermark embedding unit 605 will be described below. The digital watermark embedding unit 605 receives image data I and digital watermark w, embeds digital watermark w in image data I, and outputs image data I' embedded with digital watermark w.

Details of the process of the digital watermark embedding unit 605 will be described below. The digital watermark embedding unit 605 executes a digital watermark embedding process according to:

$$I'_{i,j} = I_{i,j} + aw_{i,j} \quad (1)$$

where $I'_{i,j}$ is the image data embedded with the digital watermark, $I_{i,j}$ is the image data before the digital watermark is embedded, $w_{i,j}$ is the digital watermark, i and j are parameters indicating x- and y-coordinate values of I, I', and w, and a is a parameter for setting the strength of the digital watermark.

For example, if a="10", a digital watermark to be embedded assumes a value ranging from −10 to +10. By increasing value a, a digital watermark with higher robustness against attacks can be embedded, but image quality deterioration becomes larger. On the other hand, by decreasing value a, the robustness against attacks decreases, but image quality deterioration can be suppressed. As in the aforementioned configuration of basic matrix m, the balance between the robustness against attacks and image quality of an image embedded with a digital watermark can be adjusted by appropriately setting value a (e.g., set by the mouse or keyboard on a GUI window upon embedding a digital watermark).

FIG. 10 shows a practical example of the digital watermark embedding process given by equation (1) when 4×4 basic matrix m is used. Referring to FIG. 10, reference numeral 1001 denotes I' in equation (1); 1002, I; and 1003, w. As shown in FIG. 10, arithmetic operations of equation (1) are made for respective elements in the matrix.

The process given by equation (1) (FIG. 10) is repeated for whole input image data I. If input image data I is made up of 24×24 pixels, it has 6 (vertical)×6 (horizontal) blocks each consisting of 4×4 pixels, as shown in FIG. 11, and the embedding process is executed for each block (4×4 pixels).

Figure 11:
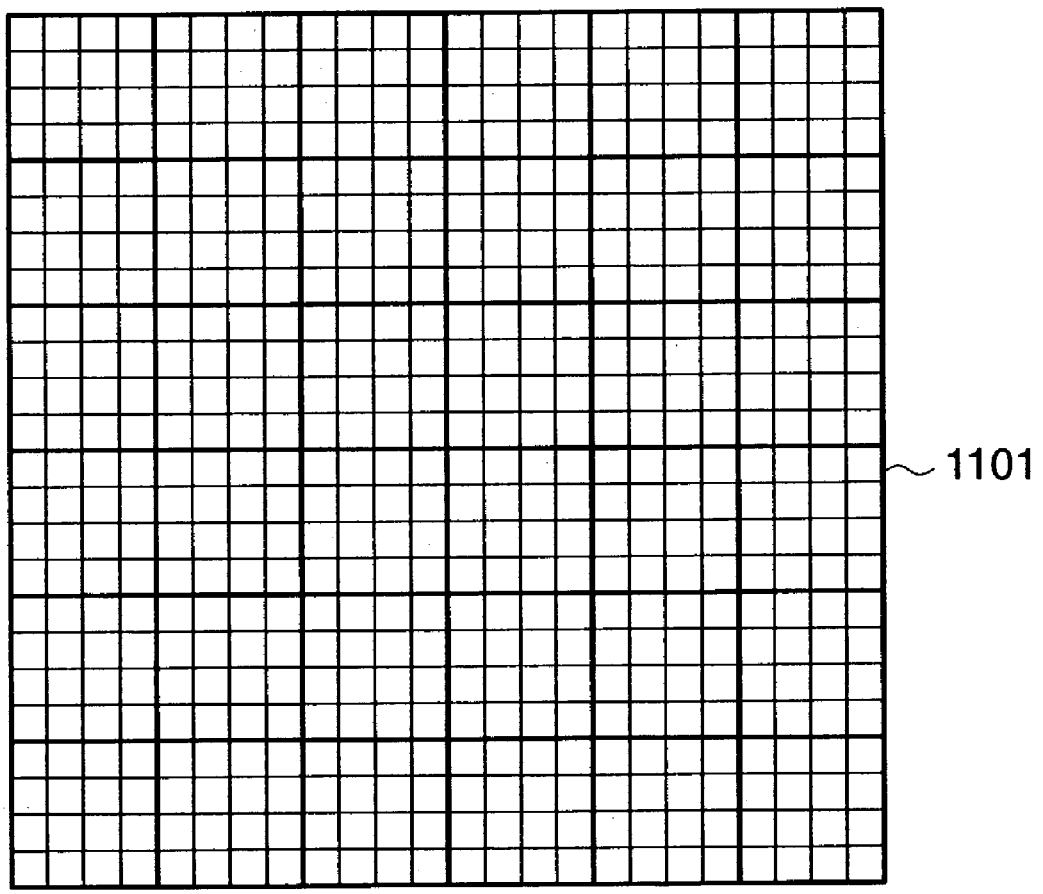
FIG. 11 shows macroblocks in the first embodiment.

As shown in FIG. 11, input image data I is broken up into blocks each of which consists of 4×4 pixels, and which do not overlap each other, and the arithmetic process given by equation (1) (FIG. 10) is repeated for respective blocks. A block which is to undergo the process given by equation (1) (FIG. 10) will be referred to as a macroblock hereinafter.

By repeating the digital watermark embedding process for all macroblocks, digital watermarks can be consequently embedded in the entire image. Furthermore, one macroblock is embedded with additional information Inf consisting of n bits. Hence, embedded additional information Inf can be extracted if there is at least one macroblock. In other words, the extraction process of embedded additional information Inf does not require the entire image, and only a portion of image data I (at least one macroblock) suffices to execute that process.

Such feature that additional information Inf can be completely extracted from a portion of image data I will be referred to as "having clipping robustness". By repeating the digital watermark embedding process for respective macroblocks over the entire image, each digital watermark can have clipping robustness. Watermarked image data I' generated in this way becomes a final output of the digital watermark embedding processor via the image output unit 606.

[Digital Watermark Extraction Processor]

The method of extracting a digital watermark embedded by the aforementioned digital watermark embedding processor will be explained below. A digital watermark extraction processor (function) which is applied to this embodiment will be explained below using FIG. 12.

Figure 12:
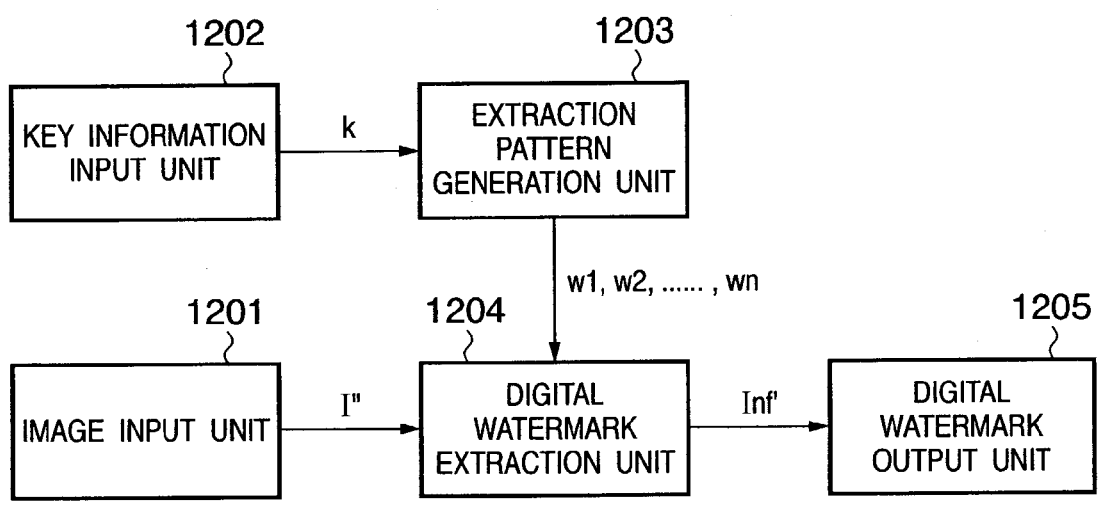
FIG. 12 is a block diagram for explaining a digital watermark extraction process in the first embodiment.

As shown in FIG. 12, the extraction processor of this embodiment comprises an image input unit 1201, key information input unit 1202, extraction pattern generation unit 1203, digital watermark extraction unit 1204, and digital watermark output unit 1205.

Note that the extraction process to be described below may be implemented by software processes. In such case, the aforementioned units should be considered as conceptual functions required for the process.

The function of the image input unit 1201 will be explained first. The image input unit 1201 receives image data I" in which watermark information may be embedded, and its output is input to the digital watermark extraction unit 1204. Since the operation of the image input unit 1201 is the same as that of the image input unit 601 mentioned above, a detailed description thereof will be omitted. Note that image data I" input by the image input unit 1201 is not limited to image data (I') embedded with a digital watermark by the aforementioned digital watermark embedding processor. Of course, image data I" may be either image data I' embedded with a digital watermark or attacked image data I'. Furthermore, image data I" may be image data I in which no watermark information is embedded.

The function of the key information input unit 1202 will be described below. The key information input unit 1202 receives key information k required to extract a digital watermark, and its output is input to the extraction pattern generation unit 1203. Note that input key information k must be the same as that input by the key information input unit 603 of the aforementioned digital watermark embedding processor. If different key information is input, additional information cannot be normally extracted. In other words, only the user who has correct key information k can extract correct additional information Inf'.

The function of the extraction pattern generation unit 1203 will be described below. The extraction pattern generation unit 1203 receives key information k from the key information generation unit 1202, generates an extraction pattern on the basis of input key information k, and outputs the generated extraction pattern.

Figure 13:
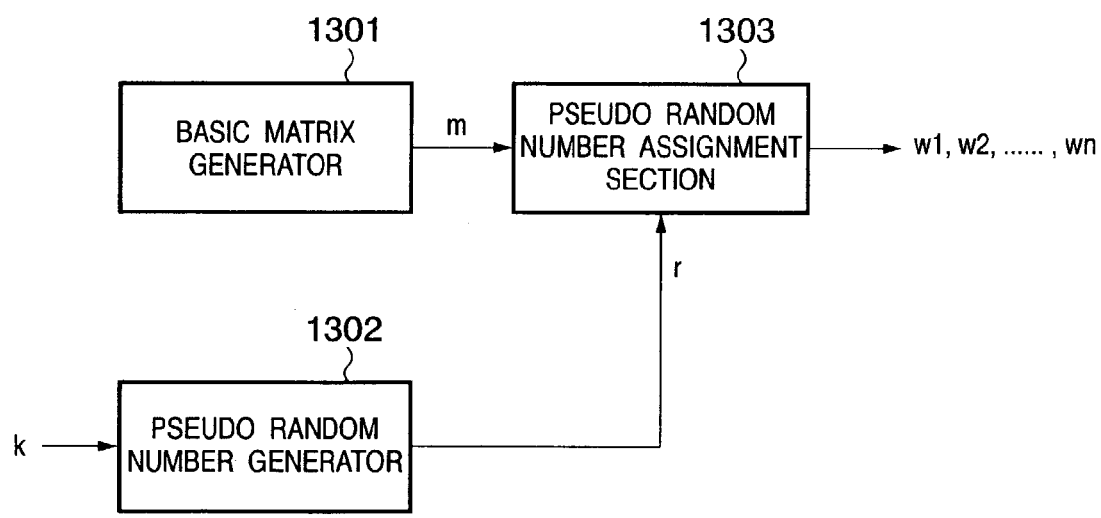
FIG. 13 is a block diagram showing an example of an extraction pattern generation unit in the first embodiment.

Details of the function of the process of the extraction pattern generation unit 1203 will be described below using FIG. 13. As shown in FIG. 13, the extraction pattern generation unit 1203 comprises a basic matrix generator 1301, pseudo random number generator 1302, and pseudo random number assignment section 1303.

Since the basic matrix generator 1301 and pseudo random number generator 1302 execute the same operations as those of the aforementioned basic matrix generator 701 and pseudo random number generator 702, a detailed description thereof will be omitted. Note that additional information cannot be normally extracted unless the basic matrix generators 1301 and 701 generate identical basic matrices.

Details of the function of the pseudo random number assignment section 1303 will be explained below. The pseudo random number assignment section 1303 receives basic matrix m and pseudo random number sequence r, and assigns respective elements of pseudo random number sequence r to predetermined elements of basic matrix m. The difference between this assignment section 1303 and the pseudo random number assignment section 703 used in the aforementioned embedding processor is that the pseudo random number assignment section 703 outputs only one extraction patterns w, while the pseudo random number assignment section 1303 outputs extraction patterns (n patterns in this case) corresponding to the number of bits of the embedded information size.

Details of the function of assigning respective elements of pseudo random number sequence r to predetermined elements of basic matrix m will be explained taking the matrix 804 shown in FIG. 8 as an example. When the matrix 804 is used, since 4-bit additional information can be embedded, four extraction patterns w1, w2, w3, and w4 are output.

Initially, of respective elements of the matrix 804, those having a value "1" are scanned in the raster order to assign respective elements of pseudo random number sequence r to them. Upon completion of assignment of respective elements of pseudo random number sequence r to all elements having a value "1", a matrix to which pseudo random number sequence r is assigned is generated as extraction pattern w1. FIG. 14 shows an example of extraction patterns. Extraction pattern w1 (1401) is an example obtained when a real number sequence r={0.7, −0.6, −0.9, 0.8} is used as pseudo random number sequence r.

The aforementioned process is repeated for the remaining elements having values "2", "3", and "4" of those of the matrix 804 to generate extraction patterns w2 (1402), w3 (1403), and w4 (1404), respectively. A pattern obtained by superposing all extraction patterns w1, w2, w3, and w4 generated in this way becomes equal to digital watermark w generated by the digital watermark embedding processor. Generated extraction patterns w1, w2, w3, and w4 are output from the extraction pattern generation unit 1203, and are input to the digital watermark extraction unit 1204.

The function of the digital watermark extraction unit 1204 will be explained below. The digital watermark extraction unit 1204 receives image data I" and extraction patterns w1, w2, . . . , wn, extracts additional information Inf' from image data I" using extraction patterns w1, w2, . . . , wn, and outputs extracted additional information Inf'. In this case, it is desired that additional information Inf' to be extracted is equal to embedded additional information Inf. However, if image data I' embedded with a digital watermark has suffered various attacks, additional information Inf does not always match additional information Inf'.

Details of the function of the digital watermark extraction unit 1204 will be explained below. The digital watermark extraction unit 1204 calculates cross-correlation values between integrated image c generated from input image data I" and extraction patterns w1, w2, . . . , wn. Integrated image c is obtained by dividing image data I" into blocks each of which has the size of a macroblock (the size of the basic matrix) and which do not overlap each other, and calculating the average of element values of each divided block.

Figure 15:
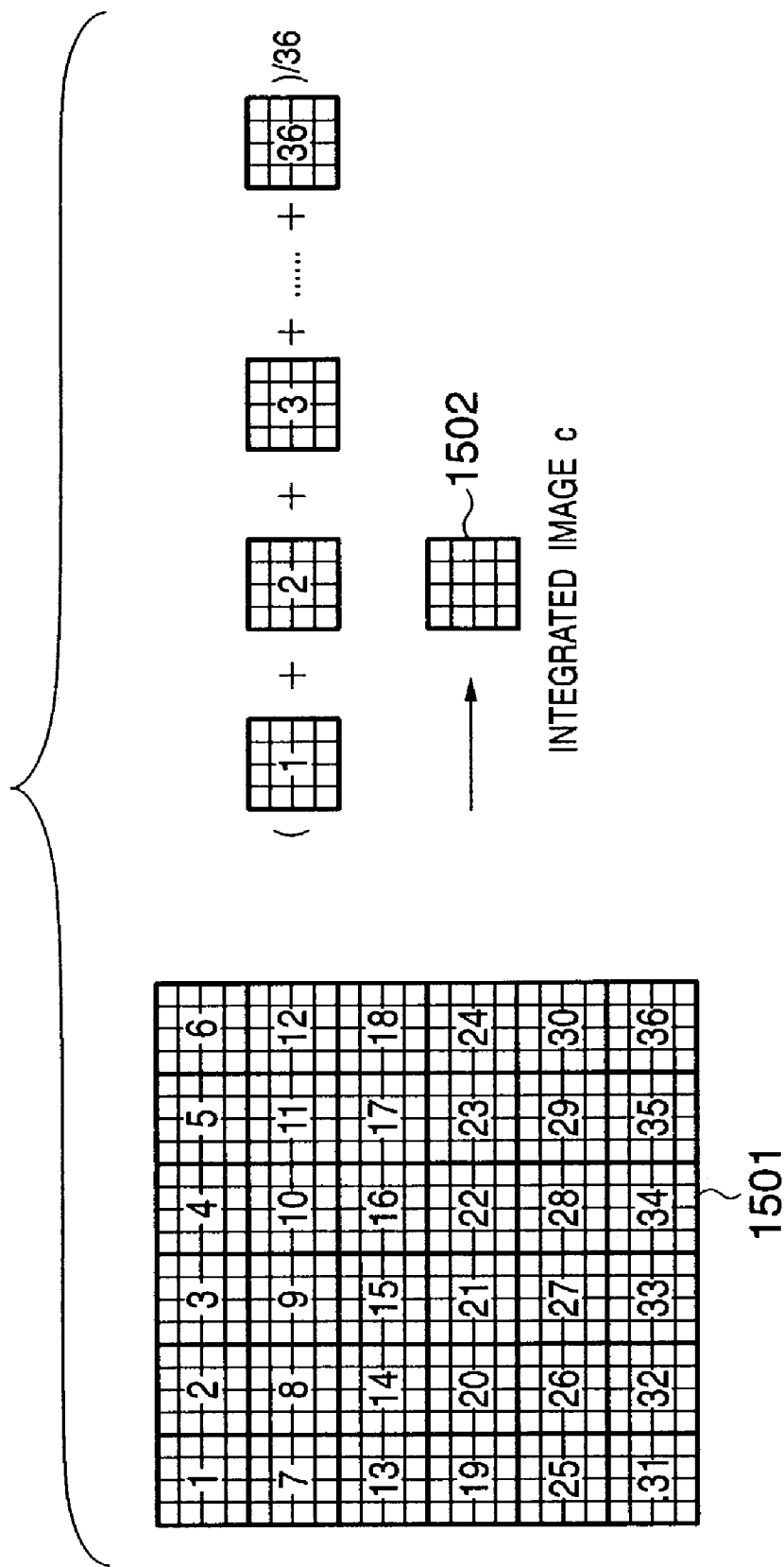
FIG. 15 is a view for explaining an example of digital watermark extraction using an integrated image in the first embodiment.

Integrated image c will be explained below using a practical example shown in FIG. 15. FIG. 15 shows an example of integrated image c when extraction patterns of 4×4 pixels, and image data I" of 24×24 pixels are input. Referring to FIG. 15, reference numeral 1501 denotes an example of blocks of 4×4 pixels, which are obtained by dividing image data I" of 24×24 pixels, and do not overlap each other. In the example shown in FIG. 15, the image data is broken up into 36 blocks. Integrated image c (1502) is obtained by calculating the average values of respective element values of these 36 blocks.

Cross-correlation values between integrated image c generated in this way, and extraction patterns w1, w2, . . . , wn are calculated respectively. An example of a method of calculating a correlation coefficient will be explained below taking a calculation of a correlation coefficient between integrated image c and extraction pattern wn as an example.

A correlation coefficient is a statistical quantity used to measure similarity between integrated image c and extraction pattern wn, and is given by:

$$\rho = c'T \cdot w'n / \{|c'T||w'n|\} \quad (2)$$

where c' and w'n are matrices each of which has as elements the differences obtained by subtracting the average values of the elements of each matrix from respective elements, and cT is the transposed matrix of c. Correlation coefficient $\rho$ assumes a value ranging from −1 to +1. If positive correlation between integrated image c and extraction pattern wn is strong, $\rho$ approaches +1; if negative correlation between integrated image c and extraction pattern wn is strong, $\rho$ approaches −1. "Positive correlation is strong" means that "extraction pattern wn becomes larger with increasing integrated image c", and "negative correlation is strong" means that "extraction pattern wn becomes smaller with increasing integrated image c". When integrated image c and extraction pattern wn have no correlation, $\rho=0$.

Based on the cross-correlation results calculated in this way, whether or not additional information Inf' is embedded in input image data I" and whether each bit that forms additional information Inf' is "1" or "0" if the additional information is embedded are determined.

The correlation coefficients between integrated image c and extraction patterns w1, w2, ..., wn are calculated, and if each calculated cross-correlation result is close to zero, it is determined that "no additional information is embedded"; if each cross-correlation result is a positive number separated from zero, it is determined that "bit 1" is embedded; and if each cross-correlation result is a negative number separated from zero, it is determined that "bit 0" is embedded.

Calculating cross-correlation is equivalent to evaluation of similarities between integrated image c and extraction patterns w1, w2, ..., wn. That is, when the aforementioned digital watermark embedding processor embeds extraction patterns w1, w2, ..., wn in image data I" (integrated image c), they are relatively similar to each other, and such similarity levels are calculated as cross-correlation values. Furthermore, when bit "1" is embedded (when extraction patterns w1, w2, ..., wn are added), positive cross-correlation values are obtained, while when bit "0" is embedded (when extraction patterns w1, w2, ..., wn are subtracted), a negative cross-correlation values are obtained.

Figure 16:
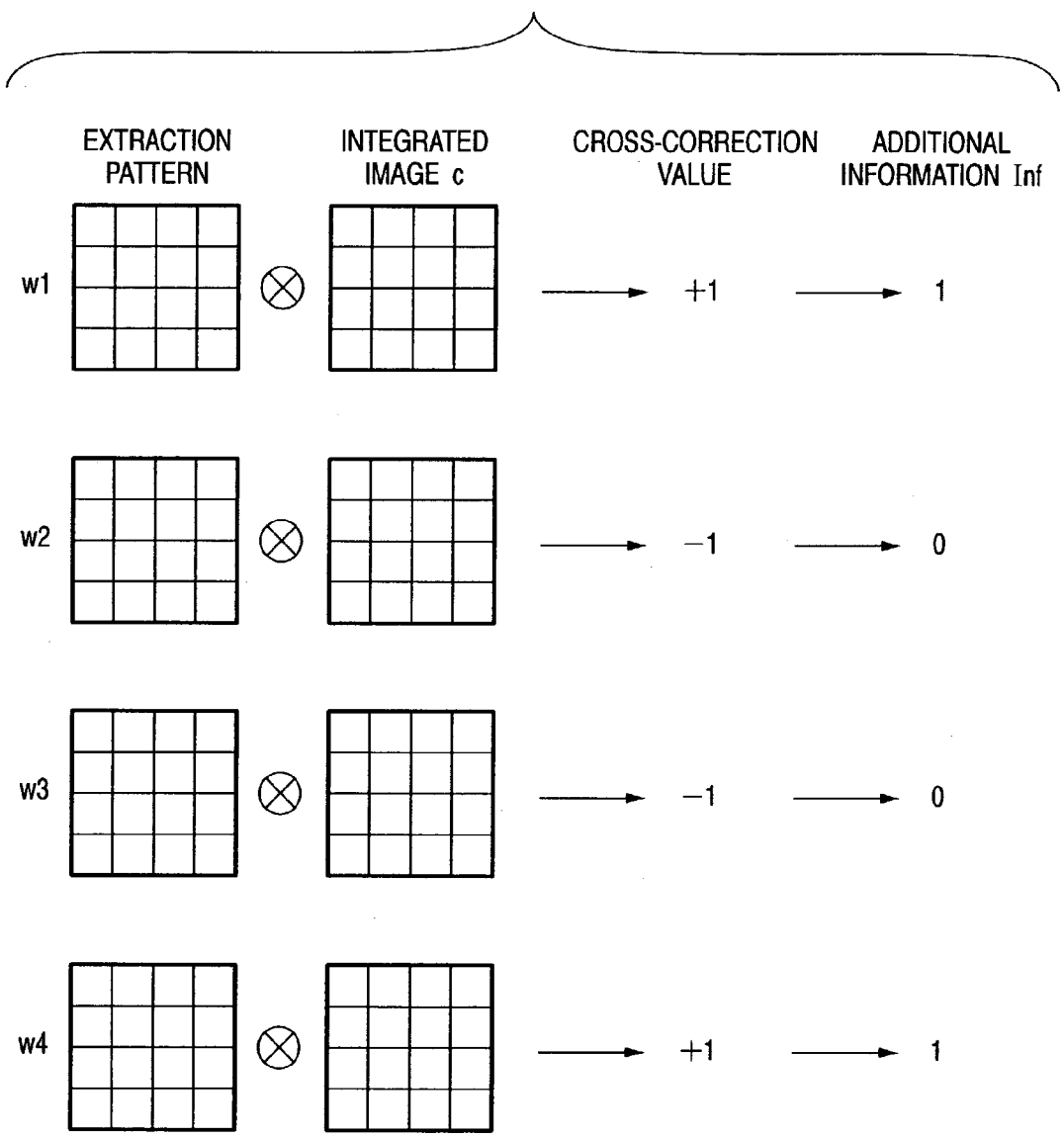
FIG. 16 shows an example of digital watermark extraction arithmetic operations using an integrated image in the first embodiment.

FIG. 16 shows an example wherein a digital watermark is extracted from image data I" (integrated image c) embedded with the aforementioned 4-bit additional information "1001" using w1, w2, w3, and w4.

The cross-correlation values between integrated image c and four extraction patterns w1, w2, ..., wn (corresponding to 4-bit additional information Inf') are respectively calculated. When additional information Inf' is embedded in input image data I" (integrated image c), correlation coefficients are respectively calculated as "1, −1, −1, 1". Based on these calculation results, it is determined that additional information Inf' is "1001", and 4-bit additional information Inf' can be finally extracted.

Extracted n-bit additional information Inf' is output via the digital watermark output unit 1205. In this case, if the digital watermark embedding processor has made an error correction encoding process and encryption process upon embedding additional information Inf, an error correction decoding process and decryption process are executed. The obtained information is finally output as a binary data sequence (additional information Inf').

Second Embodiment

The above embodiment (first embodiment) has examined a case wherein document data to be processed by the verification processor does not rotate with respect to image data output from the signature processor. However, when a document printed out from the signature processor using the printer 317 or the like is input to the verification processor using the scanner 319 or the like, input document data often rotates with respect to image data output from the signature processor. Since it is difficult to execute the identification information extraction process or additional information extraction process using rotated document data, such rotation must be corrected to the same state as image data output from the signature processor. Hence, the second embodiment will explain a verification process for document data input with a rotation.

[Verification Processor]

A verification processor (function) which is applied to this embodiment will be explained below using FIG. 17.

Figure 17:
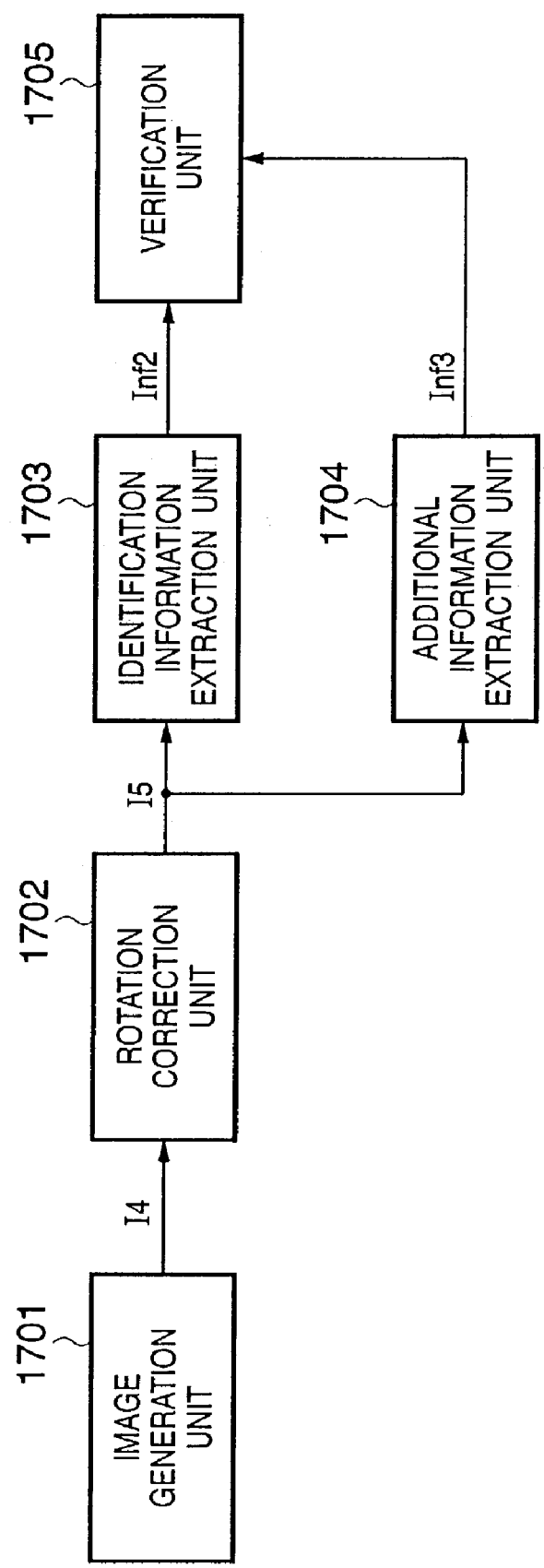
FIG. 17 is a block diagram showing the arrangement of a verification processor in the second embodiment of the present invention.

As shown in FIG. 17, the verification processor of this embodiment comprises an image generation unit 1701, rotation correction unit 1702, identification information extraction unit 1703, additional information extraction unit 1704, and verification unit 1705.

Note that the verification processor shown in FIG. 17 has an arrangement obtained by adding the rotation correction unit 1702 to the verification processor shown in FIG. 2. Hence, the rotation correction unit 1702 alone will be explained. Since the image generation units 201 and 1701, identification information extraction units 202 and 1703, additional information extraction units 203 and 1704, and verification units 204 and 1705 respectively execute the same processes, a detailed description thereof will be omitted.

The function of the rotation correction unit 1702 will be explained below. The rotation correction unit 1702 receives document data I4 generated by the document data generation unit 1701 via the RAM 305, executes a rotation correction process for input document data I4, and outputs image data I5 that has undergone the rotation correction process.

Figure 18:
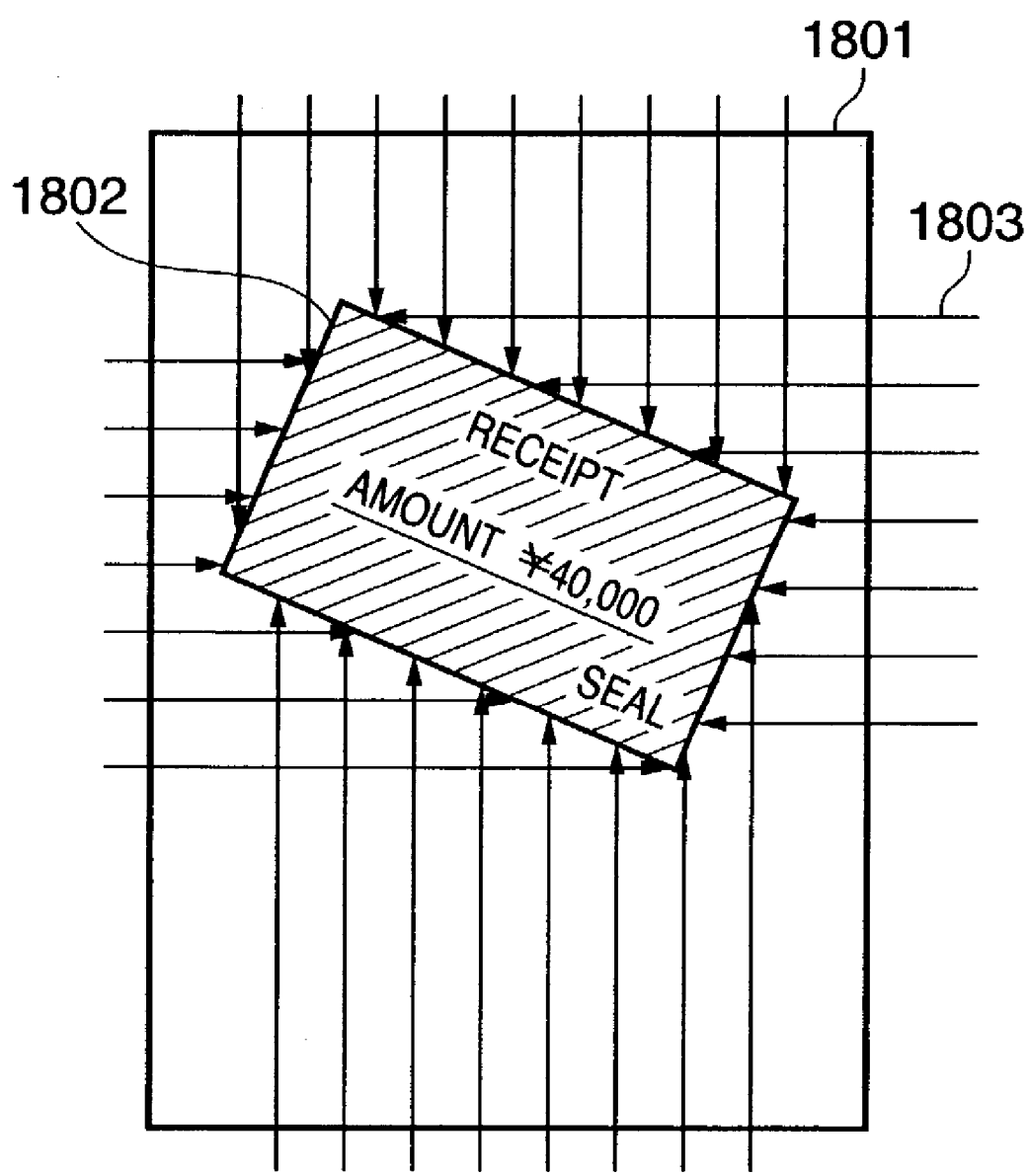
FIG. 18 is a view for explaining skew correction in the second embodiment.

An example of the rotation correction process will be described in detail below using FIGS. 18 and 19.

Figure 19:
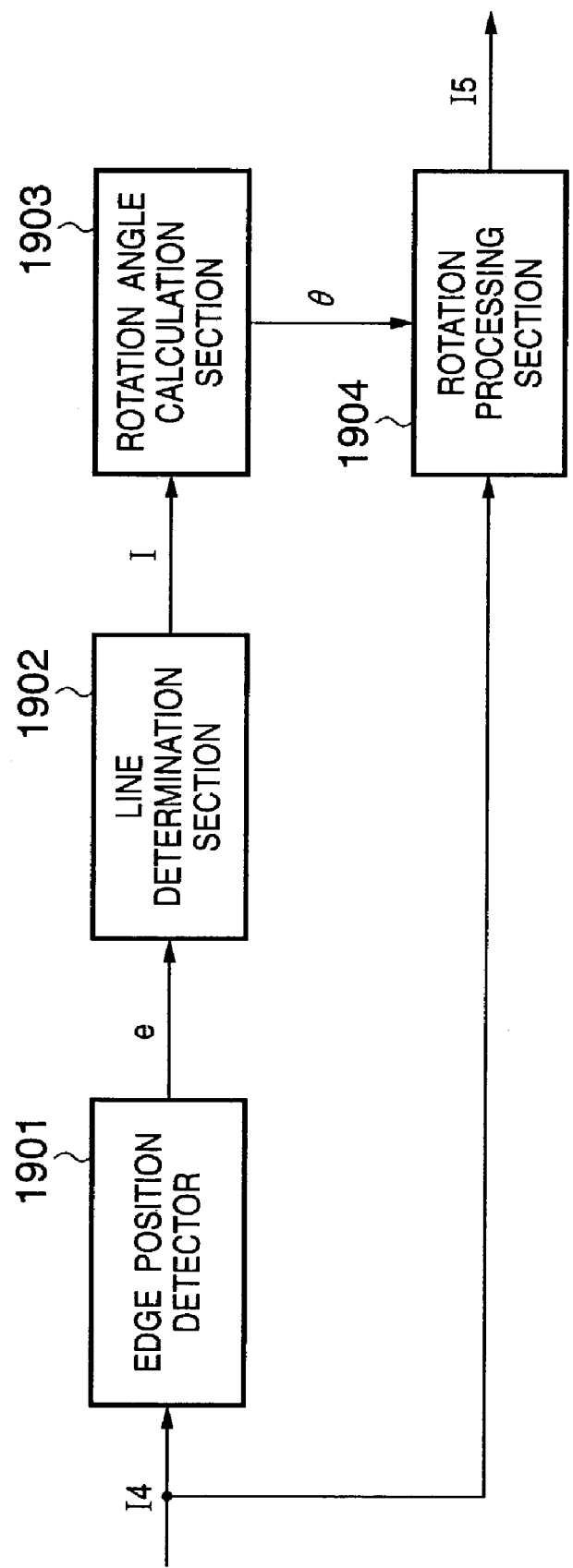
FIG. 19 is a block diagram showing the arrangement of a skew correction unit in the second embodiment.

As shown in FIG. 19, a rotation correction processor in this embodiment comprises an edge position detector 1901, line determination section 1902, rotation angle calculation section 1903, and rotation processing section 1904.

The function of the edge position detector 1901 will be explained first. The edge position detector 1901 receives document data I4 generated by the document data generation unit 1701, detects edge position e in input document data I4, and outputs detected edge position e.

The edge position detection process will be described below using FIG. 18. Referring to FIG. 18, reference numeral 1801 denotes document data I4 input to the rotation correction processor; and 1802, an image region which includes document data (where a digital watermark is embedded). From each of the four sides of the document data 1801, positions e (triangle marks in FIG. 18) of edges where a change in pixel value (luminance or density) is large are detected in directions perpendicular to the four sides, as indicated by arrows 1803 shown in FIG. 18.

The function of the line determination section 1902 will be described below. The line determination section 1902 receives edge positions e detected by the edge position detector 1901, determines four lines 1 (corresponding to the four sides of the image data 1802) using edge position e, and outputs determined four lines 1.

As examples of a determination method of four lines 1, a method of sorting detected edge positions e into four periods on the basis of maximal and minimal positions on an x-y coordinate system, and determining lines in these periods using least mean square approximation, a method of determining lines using Huff transformation, and the like may be adopted.

Note that an improvement, i.e., exclusion of edges at positions which largely depart from lines, or the like may be adopted to improve the precision of line approximation.

The function of the rotation angle calculation section 1903 will be described below. The rotation angle calculation section 1903 receives four lines 1 determined by the line determination section 1902, calculates rotation angle θ of the image data 1802 using input four lines 1, and outputs calculated rotation angle θ.

As a method of calculating rotation angle θ, an angle one of four lines 1 makes with the vertical or horizontal direction of the image data 1801 is calculated, thereby calculating the rotation angle of the image data 1802 with respect to the image data 1801. In general, when rotation angle θ is calculated by this method, the calculated angle has indefiniteness of θ±90×n (n is an integer). In this embodiment, however, if it is assumed that rotation angle θ is a very small angle, the rotation angle can be calculated by selecting a relatively small angle as rotation angle θ.

The function of the rotation processing section 1904 will be described below. The rotation processing section 1904 receives document data I4 and rotation angle θ, rotates image data I4 through rotation angle θ, clips only the region 1802 within the detected edge positions after rotation, and outputs the clipped region as image data I5.

An example of the rotation correction process in this embodiment has been explained. Note that the present invention is not limited to such specific example, and various other rotation correction processes may be used.

When image data I5 that has undergone the rotation correction process is input to the identification information extraction unit 1703 and additional information extraction unit 1704, the identification information extraction process and additional information extraction process can be normally executed. That is, using the verification processor of this embodiment, even when document data input to the verification processor rotates, a verification process can be normally done.

In general, the user sets a document on the scanner to scan it in either a landscape or portrait position. Hence, even after rotation correction, the corrected image may still have a deviation of 90°. Hence, even when extraction of additional information has failed after the above correction, an extraction process is preferably redone by rotating the input image through 90°.

Third Embodiment

The above embodiments (first and second embodiments) have explained the method in which when text data in image data I3 generated by the signature processor has been tampered with, the verification processor can detect tampering of text data, and can specify tampered text data if it has been tampered with. This method also assumes a case wherein the verification processor can correctly extract identification information Inf1 embedded as a digital watermark by the signature processor as additional information Inf3, while it cannot correctly identify identification information Inf2.

This is premised on that additional information Inf3 can be correctly extracted by the verification processor (as a value equal to identification information Inf1). However, if the verification processor cannot correctly extract additional information Inf3 due to attacks, image quality deterioration, and the like, it can determine that "information has suffered some attack", since identification information Inf2 does not match additional information Inf3. However, for example, even when additional information Inf3 cannot be extracted due to image quality deterioration, but text data is not tampered with (identification information Inf2 is correctly extracted, it is determined that "information has suffered some attack". Hence, it is desirable that additional information Inf3 is as robust as possible against attacks and image quality deterioration, so as to be correctly extracted by the verification processor.

In general, in order to improve the robustness against attacks, a digital watermark can be strongly embedded. For this purpose, for example, value a in equation (1) above is increased. However, when a digital watermark is simply strongly embedded, this unwantedly results in large image quality deterioration.

Hence, this embodiment will explain a method of embedding additional information Inf3 to be imperceptible by the human eye and as a strong digital watermark.

A signature processor (function) which is applied to this embodiment will be described below using FIG. 21. In the following description, assume that the power supply of the host computer 301 has been turned on, the OS has been loaded onto the RAM 305, and applications required to implement processes to be described in this embodiment have been loaded onto the RAM 305. Hence, respective processors are implemented by the corresponding programs and CPU 303 which executes them, and peripheral hardware in some cases.

Figure 21:
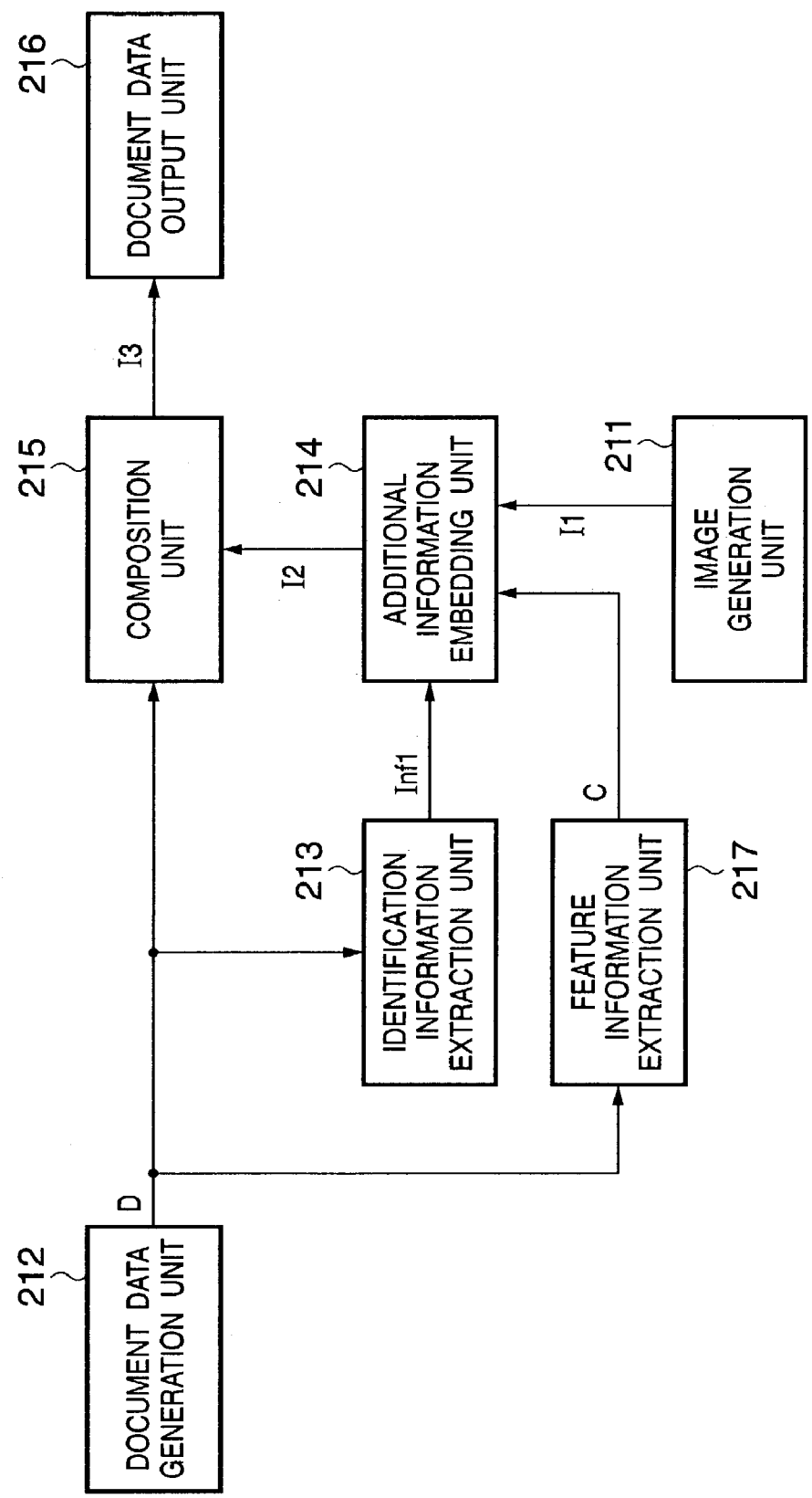
FIG. 21 is a block diagram showing the arrangement of a signature processor in the third embodiment of the present invention.

As shown in FIG. 21, the signature processor in this embodiment comprises an image generation unit 211, document data generation unit 212, identification extraction unit 213, additional information embedding unit 214, composition unit 215, document data output unit 216, and feature information extraction unit 217.

Note that the signature process to be described below may be implemented by software processes. In such case, the aforementioned units should be considered as conceptual functions required for the process.

Note that the image generation unit 211, document data generation unit 212, identification extraction unit 213, additional information embedding unit 214, composition unit 215, and document data output unit 216 have the same functions as those of the image generation unit 101, document data generation unit 102, identification extraction unit 103, additional information embedding unit 104, composition unit 105, and document data output unit 106 in FIG. 1, and a detailed description thereof will be omitted. The feature information extraction unit 217 and additional information embedding unit 214 having different functions from those in FIG. 1 will be explained below.

The function of the feature information extraction unit 217 will be explained first. The feature information extraction unit 217 receives document data D generated by the document data generation unit 212, extracts feature information C from input document data D, and outputs extracted feature information C.

Note that feature information C in this embodiment indicates positions where a digital watermark is to be strongly embedded in the additional information embedding unit 214 to be described later. Feature information C will be explained below using a practical example shown in FIG. 22.

Referring to FIG. 22, reference numeral 221 denotes input document data D. Reference numeral 222 denotes feature information C that contains all text data in the document data 221. Reference numeral 224 denotes feature information C which contains only an important part such as a seal in the document data 221. Furthermore, reference numeral 223 denotes feature information C that contains only a part (e.g., amount in the document data 221) which must be prevented from being tampered with.

In this embodiment, document data D is broken up into a plurality of rectangular regions which do not overlap each other, and it is checked if each rectangular region includes feature information. Regions including feature information (rectangular regions painted in black in FIG. 22) are output to the subsequent additional information embedding unit 214 as regions wherein a digital watermark is to be strongly embedded.

In this embodiment, each feature information is specified using a rectangular region for the sake of simplicity. However, the present invention is not limited to this, and an arbitrary shape can be designated as feature information C.

Also, in this embodiment, important parts are extracted as feature regions. However, the present invention is not limited to this, and various other regions may be extracted as feature regions. Since a strong digital watermark is embedded in each feature information C extracted by the feature information extraction unit 217, as will be described later, image quality deterioration may become large at that position. When an important part in document data is extracted as feature information C, the background of that important part suffers large image quality deterioration. Hence, in order to suppress image quality deterioration of an important part, a region around the important part may be extracted as feature information C.

Feature information C mentioned above may be manually designated by the user or may be automatically extracted. When the user manually designates feature information C, document data D may be displayed on the monitor 302 or the like, and the user may designate feature information of document data D on the monitor using the mouse 311 or the like. When feature information C is automatically extracted, document data D may undergo a binarization process, and a region including many black pixels may be designated as feature information C. However, the present invention is not limited to such specific processes, and various other feature information extraction processes may be used.

Feature information C of this embodiment has been explained. Extracted feature information C is input to the additional information embedding unit 214.

The function of the additional information embedding unit 214 will be described below. The additional information embedding unit 214 receives image data I1, identification information Inf1, and feature information C, embeds identification information Inf1 in image data I1 as a digital watermark using feature information C, and outputs image data I2 embedded with a digital watermark.

The additional information embedding process of this embodiment is processed for respective rectangular regions, so that a digital watermark is embedded in a region indicated by each feature information C extracted by the feature information extraction unit 217 to be stronger than that in other regions. For example, a in equation (1) is set to "20" in regions of feature information (black regions in FIG. 22), and is set to "10" in regions other than feature information (white regions in FIG. 22), thus executing the additional information embedding process.

However, the present invention is not limited to such specific process, and includes a case wherein the strength of a digital watermark is changed by various methods to embed digital watermarks with different strengths for respective regions.

When a digital watermark is embedded by the aforementioned method, it can be strongly embedded without causing deterioration of the quality of the entire image. Since important regions such as a seal, text data, and the like in document data D are unlikely to be attacked, the robustness of a digital watermark can be further improved by setting these regions as feature information C.

Fourth Embodiment

In the above embodiments (first, second, and third embodiments), the identification information region extraction section 2001 extracts region data R, the character recognition section 2002 recognizes characters in extracted region R, and recognized character data Inf1 is embedded in background data.

In this case, region data R must be commonly set in the signature processor and verification processor, as described above. However, the present invention is not limited to this, and the need for region data R may be obviated.

The identification information extraction unit 103 (and 202) which is applied to this embodiment will be described below using FIG. 23.

Figure 23:
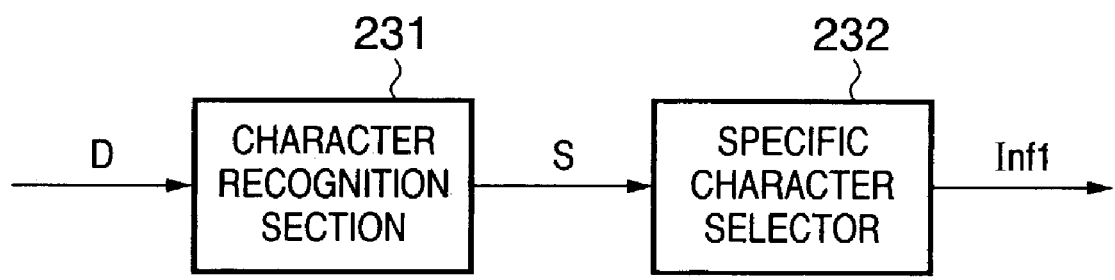
FIG. 23 is a block diagram for explaining an identification information extraction unit in the fourth embodiment of the present invention.

As shown in FIG. 23, the identification information extraction unit of this embodiment comprises a character recognition section 231 and specific character selector 232.

The function of the character recognition section 231 will be described first. The character recognition section 231 receives document data D, recognizes all characters contained in the input document data, and outputs all recognized characters as character string S. Since the process of the character recognition section 231 is the same as that of the character recognition section 2002 in FIG. 20, a detailed description thereof will be omitted.

The function of the specific character selector 232 will be described below. The specific character selector 232 receives character string S recognized by the character recognition section 231, selects specific characters from character string S, and outputs all selected characters as character string Inf1.

The specific character selector 232 selects a character string which matches predetermined characters from input character string S. For example, when amount information of a receipt or the like is used as data to be signed, numerals from "0" to "9" and symbols such as "¥" and "$" may be selected.

Alternatively, the specific character selector 232 may extract a character string which matches predetermined characters from input character string S, and may select a character string which includes a predetermined number of characters, and follows the extracted character string. For example, when the contract number on a contract document is used as data to be signed, a character string "contract number" may be extracted, and a character string of several digits, which follows the extracted character string, may be selected.

The operation of the identification information extraction unit which can be applied to this embodiment has been explained. According to this embodiment, since the character recognition section 231 recognizes all characters on document data D, while the specific character selector 232 selects characters common to the signature processor and verification processor, the signature processor and verification processor need not share region data R.

Description of Application Example

Various application examples of the aforementioned embodiments are available. In this case, an example applied to a printer driver that runs on a personal computer will be explained.

Normally, a printer driver receives data to be printed from a wordprocessing application, converts the received data into a description that a target printer can interpret, and outputs the converted data. Therefore, upon issuing a print instruction on the application, an image serving as a background is selected from a plurality of images which are registered in advance.

Upon printing a document, since data that contains character codes is passed to a printer driver, additional information to be embedded can be extracted by extracting a character string from that data. That is, in this case, the need for the aforementioned character recognition can be obviated. That additional information is embedded in the background image designated by the application. Data obtained by compositing the embedding result and data to be printed is converted into data suited to a printer, and the converted data is output via an OS.

As described above, according to this embodiment, since the contents of a document are embedded as a digital watermark in the background of the document, whether or not the document embedded with the digital watermark has been tampered with can be verified. In addition, if it is determined that the document has been tampered with, the tampered position can be specified.

Note that the additional information embedding and extraction methods explained in the above embodiments are merely examples, and other methods may be used. Hence, the above embodiments do not limit the present invention.

As can be seen from the description of the above embodiments, principal part of the present invention can be provided as an application that runs on a personal computer. Therefore, the scope of the present invention includes a computer program. Furthermore, the computer program is normally stored in a portable computer-readable storage medium such as a floppy (R) disk, CD-ROM, or the like, and is ready to run when the medium is set in the computer to copy or install the program. Therefore, the scope of the present invention also includes the computer-readable storage medium.

As described above, according to the present invention, since the contents of a document are embedded as a digital watermark in the background of the document, whether or not the document embedded with the digital watermark has been tampered with can be verified. In addition, if it is determined that the document has been tampered with, the tampered position can be specified.

As many apparently widely different embodiments of the present invention can be made without departing from the spirit and scope thereof, it is to be understood that the invention is not limited to the specific embodiments thereof except as defined in the appended claims.

What is claimed is:

1. An information processing method comprising:
   a document data input step of inputting document data including a character string;
   an extraction step of recognizing characters in the input document data, and generating, on the basis of the result of the recognition, unique identification information associated with the input document data;
   a determination step of determining a position of an area at which the character string is located within the document data input in the document data input step, and generating position information representing the determined position;
   an image input step of inputting a predetermined image which is used as a background image of the document data;
   an embedding step of embedding, using a first parameter defining a robustness, the identification information generated in the extraction step, in an area of the input background image that corresponds to the position information determined in the determination step and embedding, using a second parameter defining a robustness, the identification information generated in the extraction step, in an area of the input background image other than the area corresponding to the position information determined in the determination step, wherein the first parameter has a higher strength than the second parameter;
   a composition step of compositing the background image embedded with identification information in the embedding step and the document data input in the document data input step; and
   an output step of outputting the document data composited in the composition step.

2. The method according to claim 1, further comprising:
   an encryption step of executing an encryption process for the identification information generated in the extraction step,
   wherein the embedding step embeds the identification information, which has undergone the encryption process in the encryption step, in the background image.

3. The method according to claim 1, further comprising:
   an error correction encoding step of executing an error correction encoding process for the identification information extracted in the extraction step,
   wherein the embedding step embeds the identification information, which has undergone the error correction encoding process in the error correction encoding step, in the background image.

4. The method according to claim 1, further comprising:
   an encryption step of executing an encryption process for the identification information extracted in the extraction step; and
   an error correction encoding step of executing an error correction encoding process for the identification information that has been encrypted in the encryption step,
   wherein the embedding step embeds the identification information, which has undergone the error correction processing process in the error correction encoding step, in the background image.

5. An information processing apparatus comprising:
   a document data input means for inputting document data including a character string;
   an extraction means for recognizing characters in the input document data, and generating, on the basis of the result of the recognition, unique identification information associated with the input document data;
   a determination means for determining a position of an area at which the character string is located within the document data input by the document data input means, and generating position information representing the determining position;
   an image input means for inputting a predetermined image which is used as a background image of the document data;
   embedding means for embedding, using a first parameter defining a robustness, the identification information generated by said extraction means, in an area of the input background image that corresponds to the position information determined by the determination means, and embedding, using a second parameter defining a robustness, the identification information generated by the extraction means, in an area of the input background image other than the area corresponding to the position information determined by the determination means wherein the first parameter has a higher strength that the second parameter;
   composition means for compositing the background image embedded with the identification information by the embedding means and the document data input by the document data input means; and output means for outputting the document data composited by the composition means.

6. A computer program, embodied in a computer-readable medium, for controlling an information processing apparatus, said computer program comprising codes for performing the steps of:

a document data input step of inputting document data including a character string;

an extraction step of recognizing characters in the input document data, and generating, on the basis of the result of the recognition, unique identification information associated with the input document data;

a determination step of determining a position of an area at which the character string is located within the document data input in the document data input step, and generating position information representing the determined position;

an image input step of inputting a predetermined image which is used as a background image of the document data;

an embedding step of embedding, using a first parameter defining a robustness, the identification information generated by said extraction step, in an area of the input background image that corresponds to the position information determined in the determination step and embedding, using a second parameter defining a robustness, the identification information generated in the extraction step, in an area of the input background image other than the area corresponding to the position information determined in the determination step, wherein the first parameter has a higher strength than the second parameter; and a composition step of compositing the background image embedded with the identification information in the embedding step and the document data input in the document data input step; and an output of outputting the document data composited in the composition step.

7. A computer-readable storage medium storing a computer program of claim 6.

* * * * *

UNITED STATES PATENT AND TRADEMARK OFFICE
CERTIFICATE OF CORRECTION

PATENT NO. : 7,272,239 B2 Page 1 of 1
APPLICATION NO. : 10/419815
DATED : September 18, 2007
INVENTOR(S) : Junichi Hayashi It is certified that error appears in the above-identified patent and that said Letters Patent is hereby corrected as shown below:

Col. 11, line 42, "Infl" should read --Inf--.

Col. 12, line 54, "Infl" should read --Inf--.

Col. 13, line 27, "Infl" should read --Inf--.

Col. 14, line 56, "Infl" should read --Inf--.

Col. 15, line 4, "Infl" should read --Inf--.

line 14, "Infl" should read --Inf--.

line 26, "Infl" should read --Inf--.

Col. 26, line 63, "that" should read --than--.

Signed and Sealed this

Seventeenth Day of June, 2008

JON W. DUDAS
*Director of the United States Patent and Trademark Office*